United States Patent
Yoo et al.

(10) Patent No.: US 9,892,534 B2
(45) Date of Patent: Feb. 13, 2018

(54) METHOD AND APPARATUS FOR PERFORMING PATH RENDERING

(71) Applicant: SAMSUNG ELECTRONICS CO., LTD., Suwon-si (KR)

(72) Inventors: Jeongjoon Yoo, Hwaseong-si (KR);
Sundeep Krishnadasan, Bengaluru (IN); Jaedon Lee, Yongin-si (KR);
John Brothers, Calistoga, CA (US);
Soojung Ryu, Hwaseong-si (KR);
Wonjong Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/093,491

(22) Filed: Apr. 7, 2016

(65) Prior Publication Data
US 2017/0039743 A1    Feb. 9, 2017

(30) Foreign Application Priority Data

Aug. 3, 2015    (KR) .................. 10-2015-0109570

(51) Int. Cl.
*G06T 11/20* (2006.01)
*G06T 11/40* (2006.01)

(52) U.S. Cl.
CPC .......... *G06T 11/40* (2013.01); *G06T 11/203* (2013.01)

(58) Field of Classification Search
CPC ........................................ G06T 11/40
USPC ........................................ 345/441
See application file for complete search history.

(56) References Cited

U.S. PATENT DOCUMENTS

| 5,438,656 | A | 8/1995 | Valdes et al. |
| 7,408,553 | B1 * | 8/2008 | Toksvig .................. G06T 11/40 345/423 |
| 7,804,499 | B1 | 9/2010 | Molnar et al. |
| 8,638,337 | B2 * | 1/2014 | Tung ...................... G06T 11/40 345/555 |
| 2003/0016221 | A1 | 1/2003 | Long et al. |
| 2008/0247641 | A1 * | 10/2008 | Rasmusson ............ G06T 11/40 382/166 |
| 2010/0290089 | A1 * | 11/2010 | Stevens .............. H04N 1/40062 358/3.06 |

(Continued)

FOREIGN PATENT DOCUMENTS

| JP | 2001-52190 A | 2/2001 |
| JP | 2006-338692 A | 12/2006 |
| KR | 10-2008-0040608 A | 5/2008 |

OTHER PUBLICATIONS

Kilgard, Mark J., et al. "GPU-accelerated Path Rendering.", *Computer Graphics Proceeding, Annual conference Series*, (SIGGRAPHASIA 2012), Nov. 2012, vol. 31, Issue6, pp. 1-10.

(Continued)

*Primary Examiner* — Javid A Amini
(74) *Attorney, Agent, or Firm* — Harness, Dickey & Pierce, P.L.C.

(57) ABSTRACT

A method of performing path rendering includes selecting a tile including a path from tiles in a frame based on tile bin data, splitting the selected tile into a plurality of first sub-tiles, selecting a first sub-tile that does not include the path from the plurality of first sub-tiles, and updating an initial winding number of the selected first sub-tile. The tile bin data includes an initial winding number of each of the tiles in the frame.

19 Claims, 19 Drawing Sheets

(56) References Cited

U.S. PATENT DOCUMENTS

| | | | |
|---|---|---|---|
| 2011/0234609 A1 | 9/2011 | Cai et al. | |
| 2011/0298813 A1* | 12/2011 | Barringer | G06T 15/005 345/506 |
| 2013/0076761 A1* | 3/2013 | Ellis | G06F 15/16 345/502 |
| 2013/0141445 A1* | 6/2013 | Engh-halstvedt | G06T 5/002 345/506 |
| 2013/0335429 A1* | 12/2013 | Barringer | G06T 1/20 345/506 |
| 2014/0184633 A1 | 7/2014 | Bolz et al. | |
| 2014/0327684 A1* | 11/2014 | Engh-Halstvedt | G06T 1/20 345/506 |
| 2015/0022525 A1* | 1/2015 | Grenfell | G06T 15/005 345/427 |
| 2015/0062124 A1* | 3/2015 | Goel | G06T 15/005 345/426 |
| 2016/0042561 A1 | 2/2016 | Yoo et al. | |

OTHER PUBLICATIONS

U.S. Appl. No. 14/823,554, filed Aug. 11, 2015, Jeongjoon Yoo et al., Samsung Electronics Co., Ltd.

* cited by examiner

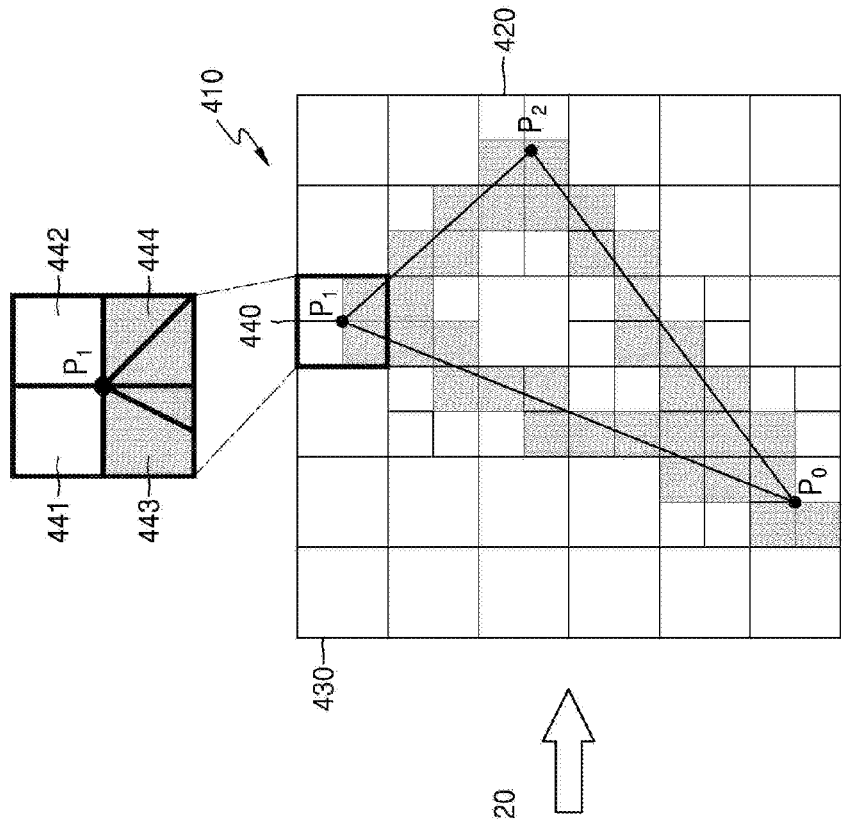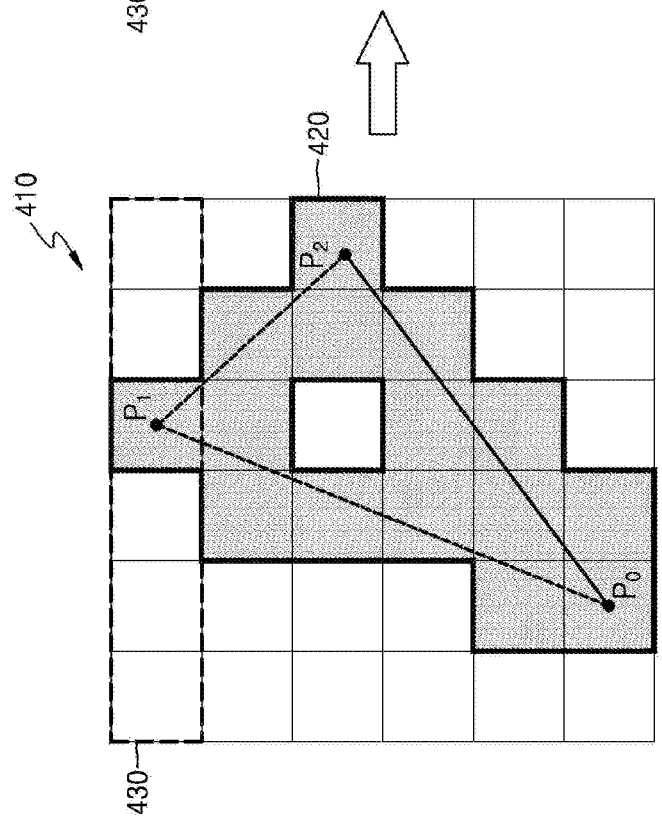

Type_List   WWW S(WWS(WGWG)S(GWGG))WW

Non-monotonic curve

Monotonic Curves

METHOD AND APPARATUS FOR PERFORMING PATH RENDERING

CROSS-REFERENCE TO RELATED APPLICATION

This application claims the benefit under 35 USC 119(a) of Korean Patent Application No. 10-2015-0109570 filed on Aug. 3, 2015, in the Korean Intellectual Property Office, the entire disclosure of which is incorporated herein by reference for all purposes.

BACKGROUND

1. Field

This application relates to methods and apparatuses for performing path rendering.

2. Description of Related Art

Methods of increasing graphics processing unit (GPU) acceleration when vector graphics or path rendering is performed are being studied. In path rendering, input data is not configured in triangles, but is configured in a combination of a command and vertexes. Thus, it is difficult to increase the acceleration performance of the GPU when the path rendering is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of performing path rendering includes selecting a tile including a path from tiles in a frame based on tile bin data; splitting the selected tile into a plurality of first sub-tiles; selecting a first sub-tile that does not include the path from the plurality of first sub-tiles; and updating an initial winding number of the selected first sub-tile; wherein the tile bin data includes an initial winding number of each of the tiles in the frame.

The method may further include splitting a first sub-tile that includes the path among the plurality of first sub-tiles into a plurality of second sub-tiles; and selecting a second sub-tile that does not include the path from the plurality of second sub-tiles; and the updating may include updating an initial winding number of the selected second sub-tile.

The method may further include determining an initial winding number of a first sub-tile that includes the path among the plurality of first sub-tiles to be an initial winding number of a tile including the first sub-tile that includes the path.

The updating may include updating the initial winding number of the selected first sub-tile based on a location and a proceeding direction of a path in a tile including the selected first sub-tile.

The method may further include splitting the path into a plurality of monotonic curves in response to the path being a non-monotonic curve; and the selecting of the tile may include selecting a tile including at least one of the plurality of monotonic curves from the tiles in the frame.

The method may further include calculating a winding number of each of pixels in the frame based on the updated initial winding number and an initial winding number in the tile bin data.

The method may further include determining whether to perform shading based on the calculated winding number.

The method may further include generating the tile bin data by determining an initial winding number of each of the tiles in the frame based on a location and a proceeding direction of the path.

The method may further include splitting an N-th sub-tile that includes the path into a plurality of (N+1)-th sub-tiles; selecting an (N+1)-th sub-tile that does not include the path from the plurality of (N+1)-th sub-tiles; and updating an initial winding number of the selected (N+1)-th sub-tile; wherein N may be greater than or equal to 2, and less than or equal to a natural number corresponding to a case in which the selected (N+1)th sub-tile includes only four pixels.

In another general aspect, a non-transitory computer-readable storage medium stores instructions to cause computing hardware to perform the method described above.

In another general aspect, an apparatus for performing path rendering includes a selector configured to select a tile including a path from tiles in a frame based on tile bin data, split the selected tile into a plurality of first sub-tiles, and select a first sub-tile that does not include the path from the plurality of first sub-tiles; and an updater configured to update an initial winding number of the selected first sub-tile; wherein the tile bin data includes an initial winding number of each of the tiles in the frame.

The selector may be further configured to split a first sub-tile that includes the path among the plurality of first sub-tiles into a plurality of second sub-tiles, and select a second sub-tile that does not include the path from the plurality of second sub-tiles; and the updater may be further configured to update an initial winding number of the selected second sub-tile.

The updater may be further configured to determine an initial winding number of a first sub-tile that includes the path from the plurality of first sub-tiles to be an initial winding number of a tile including the first sub-tile that includes the path.

The updater may be further configured to update the initial winding number of the selected first sub-tile based on a location and a proceeding direction of a path in a tile including the selected first sub-tile.

The apparatus may further include a splitter configured to split the path into a plurality of monotonic curves in response to the path being a non-monotonic curve; and the selector may be further configured to select a tile including at least one of the plurality of monotonic curves from the tiles in the frame.

The apparatus may further include a calculator configured to calculate a winding number of each of pixels in the frame based on the updated initial winding number and an initial winding number in the tile bin data.

The apparatus may further include a determiner configured to determine whether to perform shading based on the calculated winding number.

The apparatus may further include a binner configured to generate the tile bin data by determining an initial winding number of each of the tiles in the frame based on a location and a proceeding direction of the path.

The selector may be further configured to split an N-th sub-tile that includes the path into a plurality of (N+1)th sub-tiles, and select an (N+1)th sub-tile that does not include the path from the plurality of (N+1)th sub-tiles; the updater may be further configured to update an initial winding number of the selected (N+1)th sub-tile; and N may be greater than or equal to 2, and less than or equal to a natural number corresponding to a case in which the selected (N+1)th sub-tile includes only four pixels.

Other features and aspects will be apparent from the following detailed description, the drawings, and the claims.

BRIEF DESCRIPTION OF THE DRAWINGS

FIGS. 4A and 4B are diagrams for describing an example of splitting a tile into sub-tiles performed by a selector.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms, including descriptive or technical terms, used herein are to be construed as having the meanings that they have to one of ordinary skill in the art. However, the terms may have different meanings according to an intention of one of ordinary skill in the art, legal precedence, or the appearance of new technologies. Also, some terms may be arbitrarily selected by the applicant, and in this case, the meaning of these terms will be described in detail in the detailed description. Thus, the terms used herein are to be interpreted based on the meaning of the terms together with the description throughout the specification.

Also, when a part "includes" or "comprises" an element, unless there is a particular description contrary thereto, the part can further include other elements, not excluding the other elements. As used herein, the term "and/or" includes any one and any combination of any two or more of the associated listed items. The expression "at least one of," when preceding a list of elements, modifies the entire list of elements, and does not modify the individual elements of the list.

Hereinafter, various examples will be described with reference to the accompanying drawings.

Figure 1:
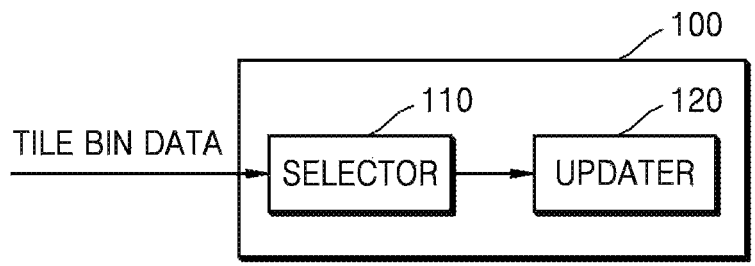
FIG. 1 is a block diagram of an example of a rendering apparatus.

FIG. 1 is a block diagram of an example of a rendering apparatus 100.

Referring to FIG. 1, the rendering apparatus 100 includes a selector 110 and an updater 120.

The selector 110 selects a tile including a path from tiles included in a frame based on tile bin data. The tile bin data is data generated as tile binning is performed, and includes information about an initial winding number of each tile included in the frame and information about a path passing through each tile.

The path is an element forming a target (for example, an object) that is used to perform rendering. For example, the path may be a straight line or a curve from one point to another point, and the object may be a closed polygon or a closed path formed by connecting at least one path to form the closed polygon or closed path. Also, the path may be referred to as a primitive, such as a line, a curve, or an arc. Accordingly, the terms 'path' and 'primitive' denote the same object. The frame includes a plurality of pixels, and the frame may be a screen on which the object is output.

The selector 110 splits the selected tile into a plurality of first sub-tiles. In other words, the selector 110 splits the tile including the path into the plurality of first sub-tiles. Also, the selector 110 selects a sub-tile that does not include the path from the first sub-tiles.

For example, the selector 110 splits a tile into four sub-tiles. For example, if the tile includes 32*32 pixels, the sub-tiles each include 16*16 pixels. However, this is merely an example, and the selector 110 may split a tile into any pre-set number of sub-tiles.

Even if a path passes through a tile, the path may not pass through all regions of the tile. In other words, even if the tile includes the path, the path may pass through only some regions (i.e., some sub-tiles) of the tile. The selector 110 splits a tile into a plurality of sub-tiles, and selects a sub-tile that includes the path. Accordingly, the rendering apparatus 100 can precisely select and process a region of a frame through which a path passes, and thus rendering quality is increased. Also, since the rendering apparatus 100 performs rendering in units of a sub-tile smaller than a tile and pre-removes sub-tiles on which rendering is not required to be performed, rendering computations decrease.

Also, the selector 110 may hierarchically split the tile based on a location of the path. For example, the selector 110 may gradually split the tile into smaller and smaller sub-tiles, such as from a tile to a smaller first sub-tile to an even smaller second sub-tile. Accordingly, the rendering apparatus 100 is able to output a precise rendering result with fewer computations.

The updater 120 updates an initial winding number of the sub-tile selected by the selector 110. The sub-tile selected by the selector 110 is a sub-tile that does not include the path. For example, the updater 120 updates an initial winding number of a sub-tile through which the path does not pass among the sub-tiles obtained by splitting the tile based on an initial winding number of the tile included in the tile bin data. The updating of the initial winding number of the sub-tile means that the initial winding number of the sub-tile is calculated based on the initial winding number of the tile.

An example of operating a rendering apparatus will now be described with reference to FIG. 2.

Figure 2:
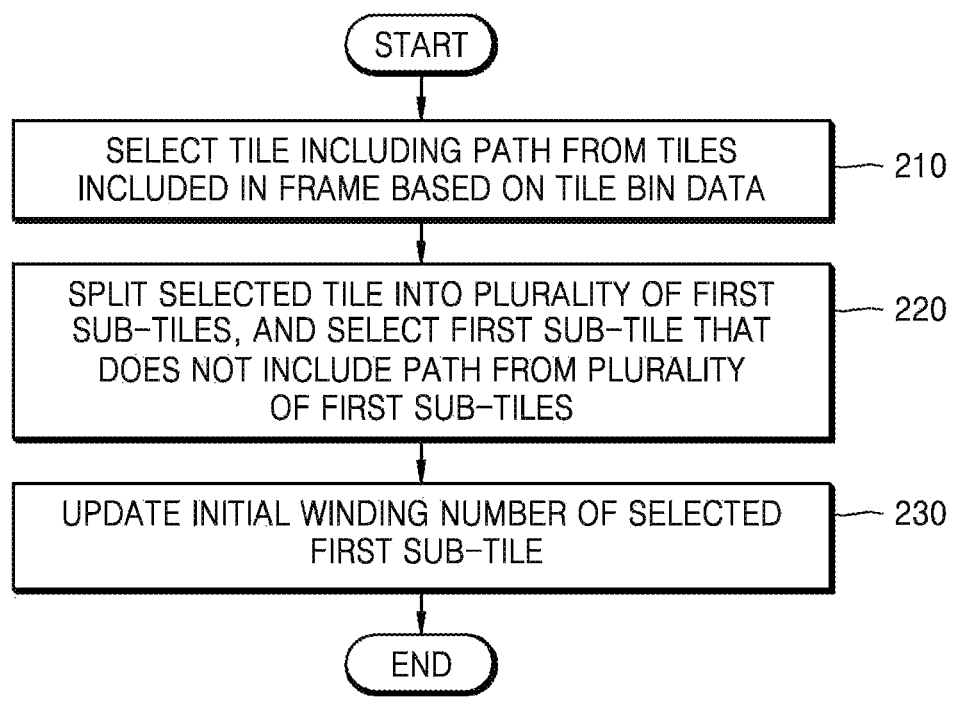
FIG. 2 is a flowchart illustrating an example of operating a rendering apparatus.

FIG. 2 is a flowchart illustrating an example of operating a rendering apparatus.

Referring to FIG. 2, a method of performing path rendering includes operations performed sequentially by the rendering apparatus 100 of FIG. 1. Accordingly, even if omitted, details described above with reference to the rendering apparatus 100 of FIG. 1 are also applicable to the method of FIG. 2.

In operation 210, the selector 110 selects a tile including a path from tiles included in a frame based on tile bin data. The tile bin data is generated by a binner 160 in FIG. 13 that will be described later. The tile bin data includes information about each tile included in the frame. For example, the tile bin data includes an 'Edge_List' indicating information about the path passing through the tile, and an initial winding number of each tile. An example of the tile bin data will now be described with reference to FIG. 3.

Figure 3:
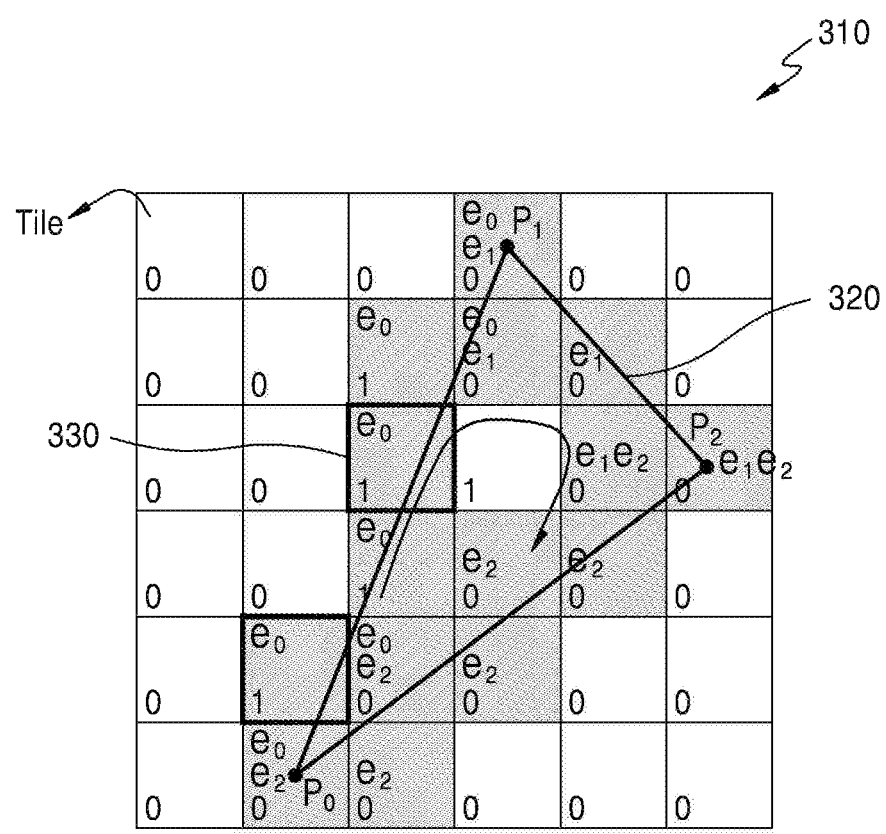
FIG. 3 is a diagram for describing an example of tile bin data.

FIG. 3 is a diagram for describing an example of tile bin data.

FIG. 3 illustrates a frame 310 including a plurality of tiles, and an object 320. The object 320 is formed by a first path $e_0$ connected from a vertex $P_0$ to a vertex $P_1$, a second path $e_1$ connected from the vertex $P_1$ to a vertex $P_2$, and a third path $e_2$ connected from the vertex $P_2$ to the vertex $P_0$.

0 or 1 indicated in the tiles of FIG. 3 denotes an initial winding number. An initial winding number of the tile in which a number is not indicated is assumed to be 0. Also, $e_0$, $e_1$, or $e_2$ indicated in the tiles of FIG. 3 is an entry in an Edge_List indicating the path passing through the tile. For example, $e_0$ and 1 are indicated in a tile 330. This indicates that a path passing through the tile 330 is the first path $e_0$ and an initial winding number of the tile 330 is 1.

The initial winding numbers of the tiles are calculated based on locations and proceeding directions of the first through third paths $e_0$ through $e_2$. For example, a default value (for example, 0) is set for each of the tiles of the frame 310, and a certain value (for example, 1) is added to or subtracted from the default value according to the locations and the proceeding directions of the first through third paths $e_0$ through $e_2$, thereby calculating the initial winding numbers of the tiles. A detailed explanation of how the initial winding numbers of the tiles illustrated in FIG. 3 are calculated is provided in paragraphs [0090]-[0166] and FIGS. 5-13B of U.S. application Ser. No. 14/823,554 filed on Aug. 11, 2015, and entitled "METHOD AND APPARATUS FOR PERFORMING TILE-BASED PATH RENDERING." The entire disclosure of application Ser. No. 14/823,554 is incorporated herein by reference for all purposes.

Also, the Edge_List is generated by selecting the tiles through which the first through third paths $e_0$ through $e_2$ pass from the tiles included in the frame 310. Path data input to the rendering apparatus 100 includes information about coordinates of each of a plurality of vertexes included in a path and commands for forming the path by combining the vertexes. The vertexes include a vertex corresponding to a start location of the path and a vertex corresponding to an end location of the path.

For example, when a straight line from a first pixel to a second pixel among pixels included in a frame is a path, vertexes are points corresponding to the first and second pixels. Accordingly, path data includes a coordinate of a first vertex corresponding to the first pixel, a coordinate of a second vertex corresponding to the second pixel, and a command for forming the straight line from the first vertex to the second vertex.

Accordingly, by referring to the path data, not only information about the coordinates of the vertexes forming the path, but also information about the location and the proceeding direction of the path may be determined. Also, the path data may include information about a color value to be set for each pixel.

Accordingly, the binner 160 to be described later selects tiles through which the first through third paths $e_0$ through $e_2$ pass from the tiles included in the frame 310 by referring to the path data, and generates an Edge_List based on the selected tiles and information about a path passing through each of the selected tiles. For example, the Edge_List may be stored in a local memory 1923 in FIG. 19 that will be described later in a form of a bitstream per tile.

An example of the binner 160 generating an Edge_List and an initial winding number of a tile included in tile bin data will be described later with reference to FIGS. 14 and 15.

Referring back to FIG. 2, in operation 220, the selector 110 splits the selected tile into a plurality of first sub-tiles, and selects a first sub-tile that does not include the path from the first sub-tiles. Also, the selector 110 splits a first sub-tile that includes the path among the plurality of first sub-tiles into a plurality of second sub-tiles. Also, the selector 110 selects a second sub-tile that does not include the path from the plurality of second sub-tiles. As described above, the selector 110 may gradually split a tile into smaller and smaller sub-tiles (i.e., may hierarchically split a tile), and thus a region through which a path actually passes in the tile may be precisely distinguished. An example of the selector 110 hierarchically splitting a tile will be described later with reference to FIGS. 7 through 9.

An example of operating the selector 110 will now be described with reference to FIGS. 4A through 5C.

FIGS. 4A and 4B are diagrams for describing an example of splitting a tile into sub-tiles performed by the selector 110.

FIG. 4A illustrates an example of a frame 410 split into tiles. Tile bin data input to the selector 110 includes an Edge_List and an initial winding number of each of the tiles included in the frame 410. Accordingly, the selector 110 identifies tiles 420 through which a path passes among the tiles included in the frame 410 by referring to the tile bin data. In FIG. 4A, the tiles 420 through which the path passes and tiles through which the path does not pass are displayed in different colors. Hereinafter, a tile through which a path passes is referred to as a gray tile, and a tile through which a path does not pass is referred to as a white tile.

Also, the selector 110 generates a 'Type_List' including information (a gray tile or a white tile) about the tiles 420 through which the path passes among the tiles included in the frame 410. For example, the selector 110 records in the Type_List information about whether each tile included in the frame 410 is a gray tile or a white tile. FIG. 4A illustrates the Type_List of tiles 430 in an uppermost row of the frame 410. Referring to FIG. 4A, the path passes through only one of the tiles 430. In other words, only one of the tiles 430 is a gray tile, and the other five tiles 430 are white tiles. Accordingly, the selector 110 generates the Type_List of tiles 430 to be 'WWWSWW'. In other words, the selector 110 generates the Type_List by recording 'W' to indicate a white tile and 'S' to indicate a gray tile beginning from a leftmost tile. However, a direction of recording a type of a tile in the Type_List is not limited to a rightward direction from the leftmost tile. The Type_List may be stored in the local memory 1923 to be described later in the form of a bitstream.

FIG. 4B illustrates an example of some of the tiles included in the frame 410 that which are split into sub-tiles. In detail, the tiles 420 of FIG. 4A are each split into four sub-tiles.

The selector 110 splits tiles including a path into a plurality of sub-tiles. Also, the selector 110 selects a sub-tile that does not include the path from the plurality of sub-tiles. In other words, the selector 110 selects a sub-tile that includes the path from the plurality of sub-tiles. Hereinafter, a sub-tile through which a path passes is referred to as a gray sub-tile and a sub-tile through which a path does not pass is referred to as a white sub-tile.

An example of the selector 110 splitting a tile into sub-tiles and selecting a white sub-tile will now be described with reference to FIGS. 5A through 5C.

Figure 5A:
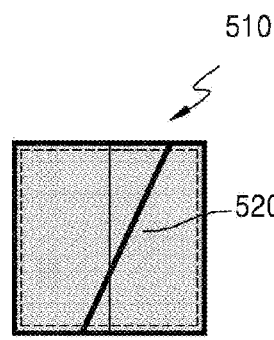
FIGS. 5A through 5C are diagrams for describing an example of operating a selector.
Figure 5B:
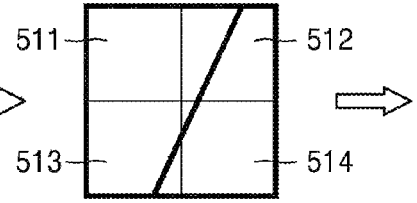
Figure 5C:
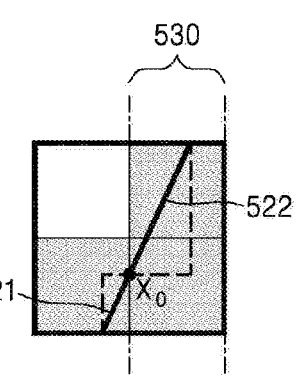

FIGS. 5A through 5C are diagrams for describing an example of operating the selector 110.

FIG. 5A illustrates a tile 510 including a path 520. As described above with reference to FIG. 4A, the tile 510 is a gray tile.

Referring to FIG. 5B, the selector 110 splits the tile 510 into a plurality of sub-tiles 511 through 514. Although in FIG. 5B, the tile 510 is split into four sub-tiles 511 through 514, the number of sub-tiles is not limited to four.

Referring to FIG. 5C, the selector 110 selects the sub-tiles 512 through 514 through which the path 520 passes from the sub-tiles 511 through 514. As described above with reference to FIG. 4B, each of the sub-tiles 512 through 514 are gray sub-tiles. For example, the selector 110 selects the gray sub-tiles 512 through 514 as follows.

First, the selector 110 determines a point where a boundary of the sub-tiles 511 through 514 and the path 520 meet. The boundary of the sub-tiles 511 through 514 may be a left, right, upper, or lower boundary of the sub-tiles 511 through 514. For example, the selector 110 determines a point $X_0$ where the path 520 and right boundaries 530 of the sub-tiles 511 through 514 meet.

Also, the selector 110 virtually splits the path 520 based on the point $X_0$. Virtually splitting a path does not mean that the path is not actually split, but means that intermediate points of the path where the path meets boundaries of sub-tiles are calculated. For example, the selector 110 virtually splits the path 520 into a first sub-path 521 and a second sub-path 522.

Also, the selector 110 forms a triangle having a sub-path as a diagonal line. Also, the selector 110 selects sub-tiles including the triangle. For example, the selector 110 forms a triangle using the first sub-path 521 as a diagonal line, and selects the sub-tile 513 including the triangle. Also, the selector 110 forms a triangle using the second sub-path 522 as a diagonal line, and selects the sub-tiles 512 and 514 including the triangle. If boundaries of sub-tiles and a path meet at a plurality of points, the selector 110 repeats the above process.

Then, the selector 110 combines the selected sub-tiles 512 through 514, and determines that the sub-tiles 512 through 514 are gray sub-tiles among the sub-tiles 511 through 514 obtained by splitting the tile 510.

Referring back to FIGS. 4A and 4B, the selector 110 updates the pre-generated Type_List based on a type of each sub-tile. As described above with reference to FIG. 4A, the selector 110 generates the Type_List of the tiles 430 to be 'WWWSWW'.

Since one gray tile 440 is included in the tiles 430, the selector 110 splits the gray tile 440 into a plurality of sub-tiles 441 through 444. Also, the selector 110 selects the sub-tiles 443 and 444 as gray sub-tiles from the sub-tiles 441 through 444.

The selector 110 updates the Type_List based on a type of each of the sub-tiles 441 through 444. For example, the selector 110 records the type of each of the sub-tiles 441 through 444 below 'S' indicating a gray tile in the pre-generated Type_List. In other words, the selector 110 records 'W' as a white sub-tile and 'S' as a gray sub-tile beginning from the sub-tile at the left top. As a result, the pre-generated Type_List is updated from 'WWWSWW' to 'WWWS(WWSS)WW'. 'WWSS' within the brackets of the updated Type_List respectively denote the types of the sub-tiles 441 through 444 in the stated order. Also, the selector 110 may stores the updated Type_List in the local memory 1923 to be described later in the form of a bitstream.

Referring back to FIG. 2, the updater 120 updates an initial winding number of the selected first sub-tile in operation 230. In other words, the updater 120 updates an initial winding number of a sub-tile that does not include a path. Tile bin data includes an initial winding number of a tile. Accordingly, the updater 120 calculates the initial winding number of the sub-tile by adding or subtracting a certain value to or from the initial winding number of the tile.

An example of the updater 120 updating an initial winding number of a sub-tile will now be described with reference to FIGS. 6A through 6C.

Figure 6B:
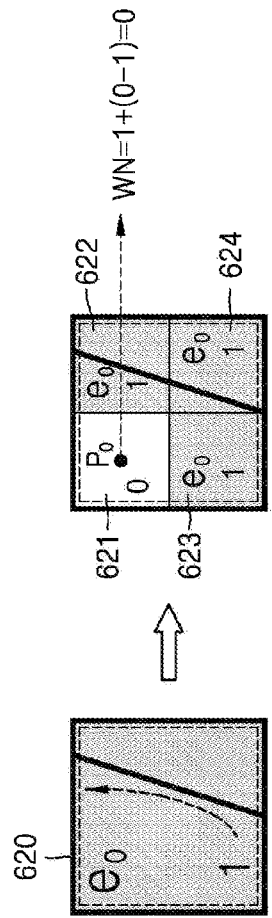
FIGS. 6A through 6C are diagrams for describing an example of operating an updater.
Figure 6C:
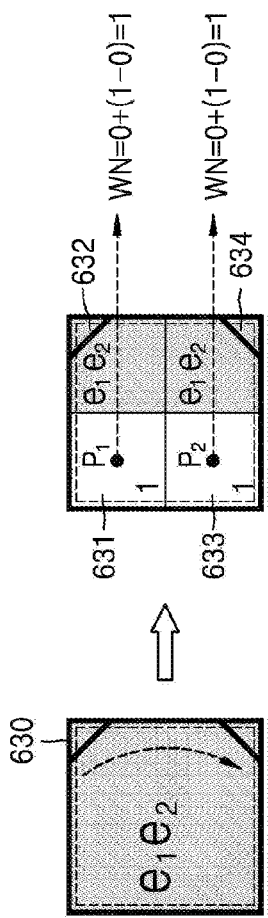
Figure 6A:
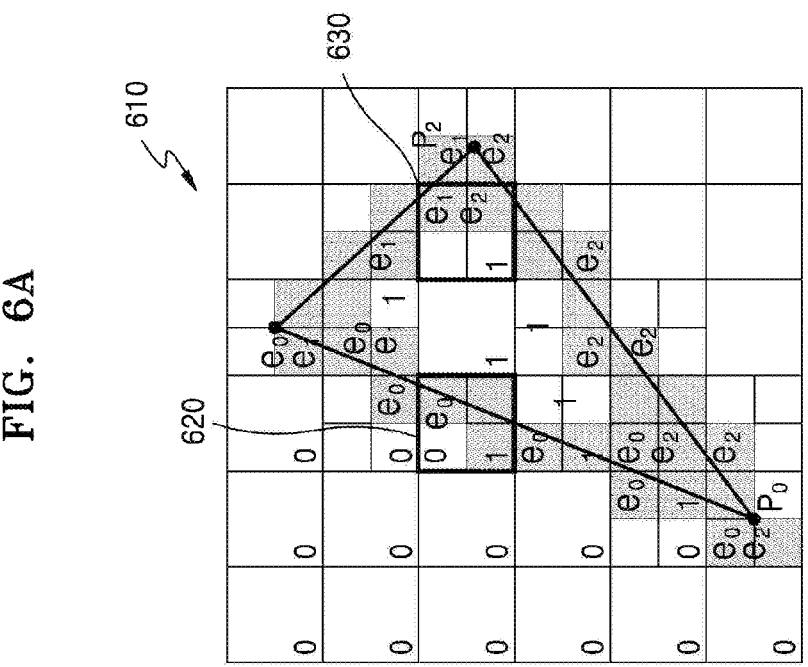

FIGS. 6A through 6C are diagrams for describing an example of operating the updater 120.

FIG. 6A illustrates an initial winding number and an Edge_List of each of tiles included in a frame 610. In detail, in FIG. 6A through 6C, 0 or 1 indicated in each tile denotes an initial winding number of each tile. Meanwhile, an initial winding number of a tile in which a number is not written is assumed to be 0. Also, $e_0$, $e_1$, or $e_2$ shown in each tile denotes an entry in the Edge_List indicating a path passing through each tile.

As described above with reference to FIG. 3, the initial winding number and the Edge_List of each tile are included in tile bin data. Accordingly, FIG. 6A is a diagram of information included in the tile bin data. An example of calculating an initial winding number of each of sub-tiles included in a first gray tile 620 and a second gray tile 630 among the tiles included in the frame 610 will now be described with reference to FIGS. 6B and 6C.

FIG. 6B illustrates the first gray tile 620. It is assumed that the first path $e_0$, passes through the first gray tile 620 counterclockwise, and an initial winding number of the first gray tile 620 is 1.

The selector 110 splits the first gray tile 620 into a plurality of sub-tiles 621 through 624. Also, the selector 110 selects the sub-tiles 622, 623, and 624 as gray sub-tiles from the sub-tiles 621 through 624. In other words, the selector 110 determines the sub-tile 621 to be a white sub-tile.

The updater 120 updates an initial winding number of the sub-tile 621 that is a white sub-tile. In detail, the updater 120 updates the initial winding number of the sub-tile 621 based on a location and a proceeding direction of the first path $e_0$, in the first gray tile 620. For example, the updater 120 calculates the initial winding number of the sub-tile 621 by adding or subtracting a certain value (for example, 1) to or from 1 that is the initial winding number of the first gray tile 620. For example, the updater 120 calculates the initial winding number of the sub-tile 621 according to Equation 1 below.

$$WN = WN_{init} + (N_{CW} - N_{CCW}) \quad (1)$$

In Equation 1, WN denotes the initial winding number of the sub-tile 621, and $WN_{init}$ denotes the initial winding number of the first gray tile 620. Also, $N_{CW}$ denotes a value determined based on a path located on one side of a point $P_0$ included in the sub-tile 621 and proceeding clockwise (from top to bottom). Also, $N_{CCW}$ denotes a value determined based on a path located on one side of the point $P_0$ and proceeding counterclockwise (from bottom to top).

Referring to FIG. 6B, the initial winding number ($WN_{init}$) of the first gray tile 620 is 1, and since the first path $e_0$ located on the right side of the point $P_0$ proceeds counterclockwise, $N_{CCW}$ is 1. Accordingly, the updater 120 calculates the initial winding number (WN) of the sub-tile 621 to be 0 according to Equation 1.

FIG. 6C illustrates the second gray tile 630. It is assumed that the second and third paths $e_1$ and $e_2$ pass through the second gray tile 630 clockwise, and an initial winding number of the second gray tile 630 is 0.

The selector 110 splits the second gray tile 630 into a plurality of sub-tiles 631 through 634, and determines the sub-tiles 631 and 633 to be white sub-tiles.

An initial winding number ($WN_{init}$) of the second gray tile 630 is 0, and since the second path $e_1$ located on the right side of the point $P_1$ included in the sub-tile 631 proceeds clockwise, $N_{CW}$ is 1. Accordingly, the updater 120 calculates an initial winding number (WN) of the sub-tile 631 that is the white sub-tile to be 1 according to Equation 1. In a similar manner, since the third path $e_2$ located on the right side of a point $P_2$ included in the sub-tile 633 proceeds clockwise, $N_{CW}$ is 1. Accordingly, the updater 120 calculates an initial winding number (WN) of the sub-tile 633 that is the white sub-tile to be 1 according to Equation 1.

The updater 120 uses an initial winding number of a tile including a certain sub-tile including a path among sub-tiles of the tile as an initial winding number of the certain sub-tile. In other words, an initial winding number of each of the sub-tiles 622 through 624, which are gray sub-tiles, of FIG. 6B is determined to be 1, i.e., an initial winding number of the first gray tile 620. Also, an initial winding number of each of the sub-tiles 632 and 634, which are gray sub-tiles, of FIG. 6C is determined to be 0, i.e., an initial winding number of the second gray tile 630.

As described above with reference to FIGS. 6A through 6C, the updater 120 determines an initial winding number of each of sub-tiles obtained by splitting a tile including a path based on an initial winding number of the tile. In detail, for a white sub-tile, a new initial winding number is calculated, and for a gray sub-tile, an initial winding number of a tile in which the gray sub-tile is included is used. An Edge_List of a tile including a gray sub-tile is used as an Edge_List of the gray sub-tile. Similarly, an Edge_List of a gray (N−1)th sub-tile including a gray N-th sub-tile is used as the Edge_List of the gray N-th sub-tile.

The updater 120 updates tile bin data to include a newly calculated initial winding number of a sub-tile and/or an initial winding number of a sub-tile determined based on an initial winding number of a tile. In other words, the updater 120 updates the tile bin data by replacing an initial winding number of a tile included in the tile bin data with an initial winding number of each of sub-tiles obtained by splitting the tile. Also, the updater 120 stores the updated tile bin data in the local memory 1923 to be described later.

As described above with reference to FIGS. 2 through 6C, the selector 110 splits a tile into a plurality of sub-tiles, and re-splits the sub-tiles into a plurality of sub-tiles. For example, when the tile includes 32*32 pixels, the selector 110 splits the tile into first sub-tiles each including 16*16 pixels. Then, the selector 110 splits the first sub-tiles into second sub-tiles each including 8*8 pixels. The selector 110 may continue splitting a tile until a sub-tile includes 2*2 pixels.

An example of the selector 110 hierarchically splitting a tile will now be described with reference to FIGS. 7 and 8.

Figure 7:
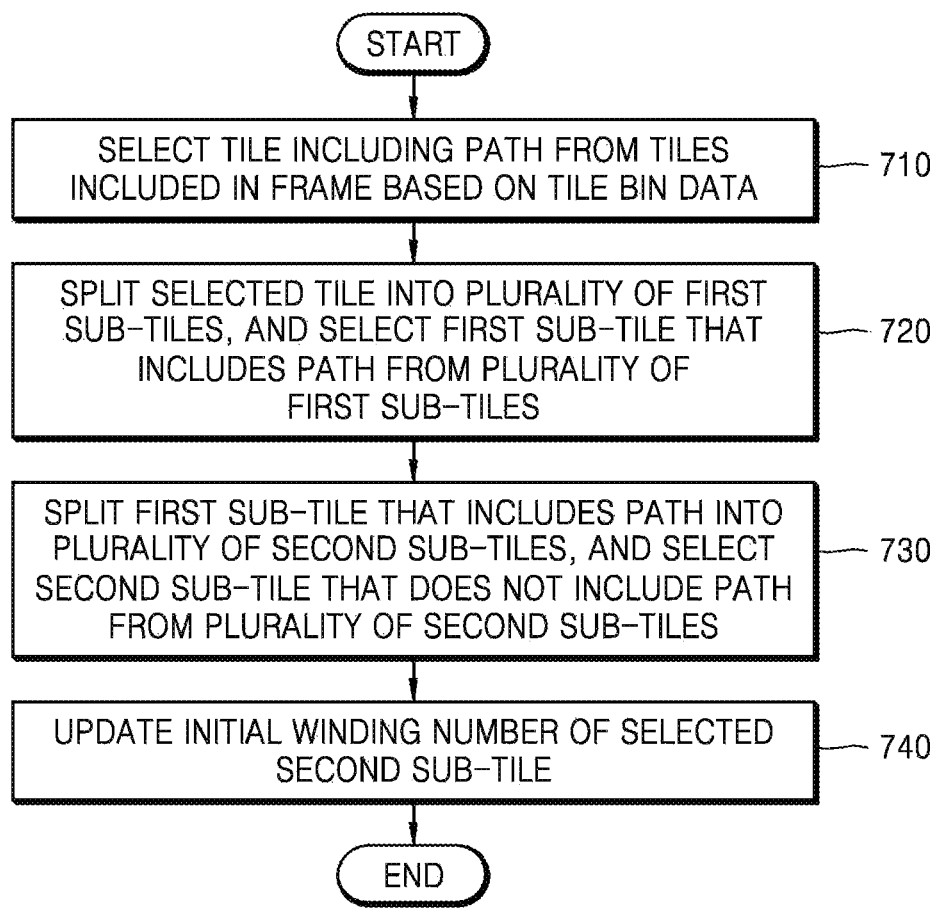
FIG. 7 is a flowchart illustrating another example of operating a rendering apparatus.

FIG. 7 is a flowchart illustrating another example of operating the rendering apparatus 100.

Referring to FIG. 7, a method of performing path rendering includes operations that are performed sequentially by the rendering apparatus 100 of FIG. 1. Accordingly, even if omitted, details described above with reference to the rendering apparatus 100 of FIG. 1 are also applicable to the method of FIG. 7.

Operations 710, 720, and 740 of FIG. 7 respectively correspond to operations 210, 220, and 230 of FIG. 2. Thus, details about operations 710, 720, and 740 will not be provided again.

In operation 730, the selector 110 splits a first sub-tile including a path into a plurality of second sub-tiles. Then, the selector 110 selects a second sub-tile that does not include the path from the plurality of second sub-tiles.

In other words, the selector 110 re-splits the first sub-tile through which the path passes among the plurality of first sub-tiles into the plurality of second sub-tiles that are smaller than the first sub-tile. Also, the selector 110 may re-split a second sub-tile through which the path passes among the plurality of second sub-tiles into a plurality of third sub-tiles that are smaller than the second sub-tile. As such, the selector 110 may continue to split a sub-tile through which a path passes until a sub-tile includes 2*2 pixels.

Operations of the selector 110 described above will now be described with reference to FIG. 8.

Figure 8:
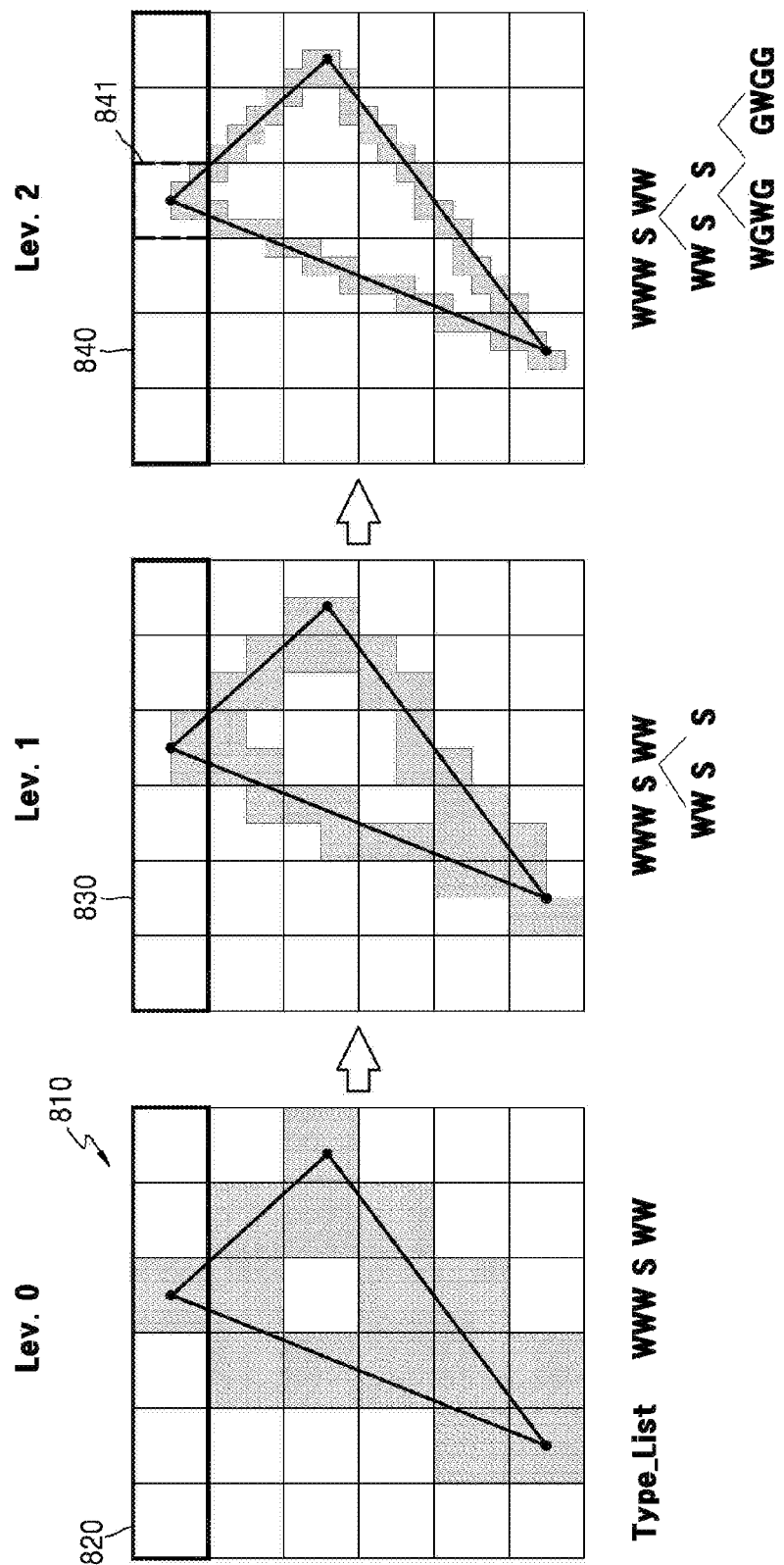
FIG. 8 is a diagram for describing another example of operating a selector.

FIG. 8 is a diagram for describing another example of operating the selector 110.

In FIG. 8, a level 0 denotes a state in which a frame 810 is split into tiles. Also, a level 1 denotes a state in which gray tiles are each split into first sub-tiles. Also, a level 2 denotes a state in which gray first sub-tiles are each split into smaller second sub-tiles. Splitting of only up to the level 2 is shown in FIG. 8, but the selector 110 may further split a sub-tile up to a level N as described above. N is a natural number corresponding to a case in which four pixels (2*2 pixels) are included in a sub-tile.

Also, FIG. 8 illustrates a Type_List of each level. Processes of generating the Type_List of tiles 820 in the level 0 and the Type_List of tiles 830 in the level 1 are the same as the processes described above with reference to FIGS. 4A and 4B. Accordingly, details thereof will not be provided again.

The Type_List of tiles 840 in the level 2 is generated in the same manner as the Type_List in the other levels. Only a tile 841 among the tiles 840 is a gray tile, and the remaining five tiles among the tiles 840 are white tiles. Also, the tile 841 is split into first sub-tiles (level 1), and a gray sub-tile among the first sub-tiles (hereinafter, referred to as a first gray sub-tile) is split into second sub-tiles (level 2).

The selector 110 updates the Type_List based on a type of each of the second sub-tiles. For example, the selector 110 records the type of each of the second sub-tiles below 'S' indicating the first gray sub-tile in the Type_List in the level 1. In other words, the selector 110 records 'W' for a second white sub-tile and 'G' for a second gray sub-tile from a second sub-tile at the left top. Finally, the pre-generated Type_List 'WWWS(WWSS)WW' is updated to 'WWWS (WWS(WGWG)S(GWGG))WW'. 'WGWG' or "GWGG' included in brackets in the updated Type_List respectively denote the types of the second sub-tiles. Also, the selector 110 may stores the updated Type_List in the local memory 1923 to be described later in the form of a bitstream.

Figure 9:
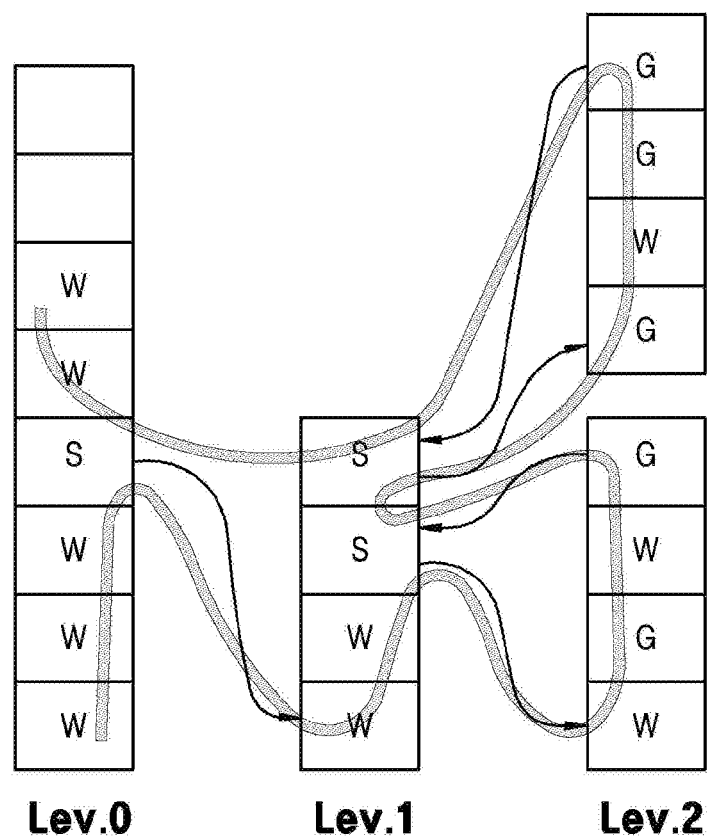
FIG. 9 is a diagram for describing an example of a Type_List expressed in a bitstream.

FIG. 9 is a diagram for describing an example of a Type_List expressed in a bitstream.

'WWWS(WWS(WGWG)S(GWGG))WW' shown in FIG. 9 denotes the Type_List of the tiles 840 of FIG. 8. As described above with reference to FIG. 8, when the selector 110 splits a tile into sub-tiles up to a level 2 and selects a sub-tile through which a path passes from the sub-tiles, the Type_List is generated in continuous bits, such as 'WWWS (WWS(WGWG)S(GWGG))WW'. 'S' and 'G' have the same bit value, and 'W' has a different bit value than 'S' and 'G'. Accordingly, 'S', 'G', and 'W' may be distinguished with only 1 bit. The bitstream forming the Type_List is transmitted to a calculator 130 in FIG. 10 that will be described later, and is used by the calculator 130 to calculate a winding number of each of pixels included in a frame.

FIG. 9 illustrates a data structure corresponding to a bitstream 'WWWS(WWS(WGWG)S(GWGG))WW'. In detail, a level 0 obtains a bit having a largest size, and levels 1 through N each only require a 4-bit stack.

First, in the level 0, bit values are input until a bit value corresponding to 'S' is identified. When the bit value corresponding to 'S' is input, a level is decreased by one, and bit values after 'S' are input. Then, when the bit value corresponding to 'S' is input again, a level is decreased by one again. When the 4-bit stack of each level is all filled, a level is increased by one, and the 4-bit stack is stored. All bit values included in the filled 4-bit stack are removed via a POP operation after processes on sub-tiles corresponding to the filled 4-bit stack are all performed. For example, since bit values of 'WGWG' input in the level 2 are stored in a stack, processed, and then filled in a 4-bit stack, the stack is emptied and the level is increased to the level 1. Then, since a bit value input thereafter is 'S', the level is decreased to the level 2 and bit values of 'GWGG' are sequentially stored and processed. Then, since a 4-bit stack is filled, the level is increased to the level 1 to determine that the 4-bit stack is filled with bit values of 'WWSS' and the stack is emptied via a POP operation. Then, a level is increased to the level 0. Thereafter, remaining bit values are processed in the same manner described above.

As described above, since the calculator 130 determines to which level a bit value currently input belongs, the calculator 130 may determine a type of a sub-tile (i.e., a white sub-tile or a gray sub-tile). Accordingly, the calculator 130 may calculate a winding number of a pixel included in a sub-tile.

Figure 10:
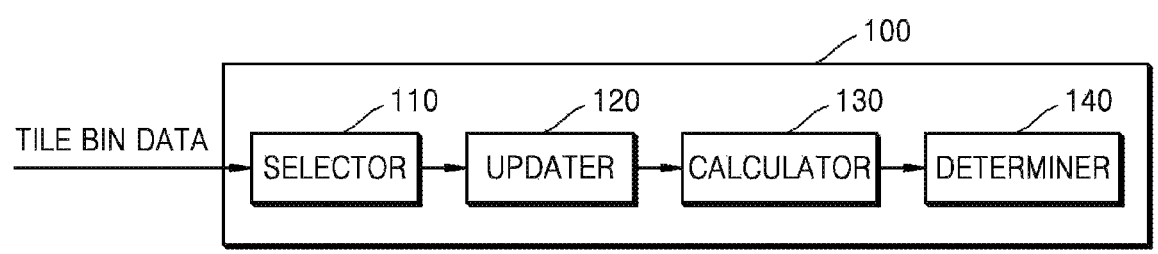
FIG. 10 is a block diagram of another example of a rendering apparatus.

FIG. 10 is a block diagram of another example of the rendering apparatus 100.

Referring to FIG. 10, the rendering apparatus 100 not only includes the selector 110 and the updater 120, but also includes the calculator 130 and a determiner 140. Operations of the selector 110 and the updater 120 of FIG. 10 are the same as the operations of the selector 110 and the updater 120 described above with reference to FIGS. 1 through 9. Accordingly, details about the selector 110 and the updater 120 will not be provided again.

The calculator 130 calculates a winding number of each of pixels included in a frame based on an updated initial winding number and an initial winding number included in tile bin data. In detail, the calculator 130 calculates the winding number of each of the pixels included in the frame based on an initial winding number of each of sub-tiles obtained by splitting a gray tile, and an initial winding number of each of white tiles. The initial winding number of each sub-tile and the initial winding number of each white tile are included in the tile bin data.

As described above with reference to FIGS. 4A, 4B, 8, and 9, the Type_List includes information about types of tiles included in a frame and types of sub-tiles obtained by splitting a tile. In other words, the Type_List includes information about whether a tile is a white tile or a gray tile, and about whether a sub-tile is a white sub-tile or a gray sub-tile. Accordingly, the calculator 130 is able determine a type of a tile or a sub-tile by referring to the Type_List.

The calculator 130 determines a type of a tile or a sub-tile by referring to the Type_List, and reads an initial winding number of the tile or the sub-tile from updated tile bin data. If the tile or the sub-tile is determined to be a white tile or a white sub-tile, the calculator 130 determines a winding number of each of pixels included in the white tile or the white sub-tile to be the same as the initial winding number. Conversely, when the sub-tile is determined to be a gray sub-tile, the calculator 130 calculates a winding number of each of pixels included in the gray sub-tile based on the initial winding number. An example of the calculator 130 calculating a winding number of a pixel included in a gray sub-tile will be described later with reference to FIG. 18.

The determiner 140 determines whether to perform shading based on a winding number of a pixel. Shading is performed by a fragment shader 1931 in FIG. 19 that will be described later. Accordingly, the determiner 140 determines whether to direct the fragment shader 1931 to perform shading on a pixel. Shading may be a process of setting a color for each pixel, but is not limited thereto. For example, shading may be a process of setting a brightness for each pixel or a process of setting a texture for each pixel. Also, the fragment shader 1931 may perform shading on a pixel based on a texture. The determiner 140 may determine whether to perform shading based on a pre-set rule. An example of the determiner 140 determining whether to perform shading will be described later with reference to FIG. 17.

Figure 11:
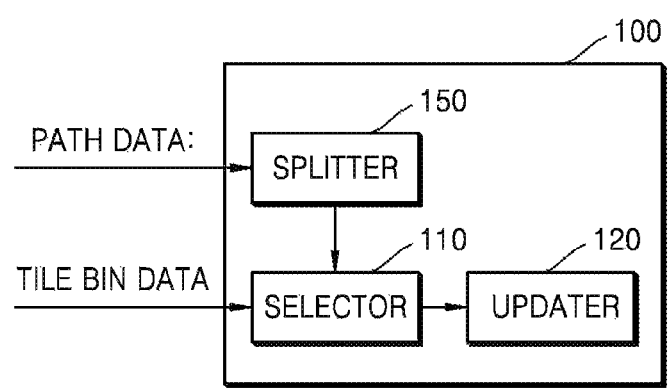
FIG. 11 is a block diagram of another example of a rendering apparatus.

FIG. 11 is a block diagram of another example of the rendering apparatus 100.

Referring to FIG. 11, the rendering apparatus 100 includes not only the selector 110 and the updater 120, but also a splitter 150. Operations of the selector 110 and the updater 120 of FIG. 11 are the same as the operations of the selector 110 and the updater 120 described above with reference to FIGS. 1 through 9. Accordingly, details about the selector 110 and the updater 120 will not be provided again.

When a path is a non-monotonic curve, the splitter 150 splits the non-monotonic curve into a plurality of monotonic curves. For example, the splitter 150 may split the non-monotonic curve into the monotonic curves based on De Casteljau's algorithm. When path data includes information about the non-monotonic curve, the splitter 150 changes the information about the non-monotonic curve to information about the monotonic curves. Also, the splitter 150 transmits the information about the monotonic curves to the selector 110, and the calculator 130 selects a tile through which at least one of the monotonic curves passes from tiles included in a frame.

An example of the splitter 150 splitting a non-monotonic curve into a plurality of monotonic curves will now be described with reference to FIGS. 12A and 12B.

Figure 12A:
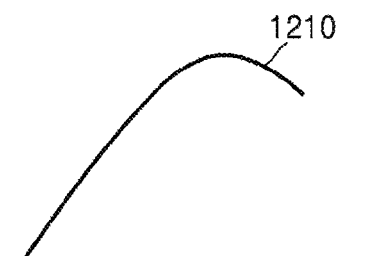
FIGS. 12A and 12B are diagrams for describing an example of operating a splitter.
Figure 12B:
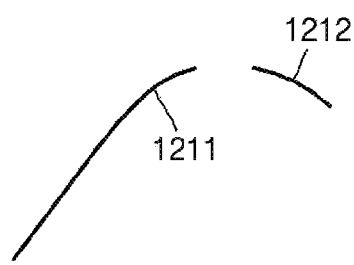

FIGS. 12A and 12B are diagrams for describing an example of operating the splitter 150.

FIG. 12A illustrates an example of a non-monotonic curve 1210. A path in a straight line has a positive inclination value or a negative inclination value. Accordingly, when the path in the straight line is on a 2-dimensional (2D) coordinate plane, a y-coordinate component of the path always increases or decreases when an x-coordinate component of the path increases. However, a y-coordinate component of the non-monotonic curve 1210 of FIG. 12A does not always increase or always decrease when an x-coordinate component of the non-monotonic curve 1210 increases.

FIG. 12B illustrates examples of two monotonic curves 1211 and 1212. The monotonic curves 1211 and 1212 of FIG. 12B are obtained by splitting the non-monotonic curve 1210 of FIG. 12A. When the monotonic curves 1211 and 1212 exist on a 2D coordinate plane, a y-coordinate component of the monotonic curve 1211 always increases when an x-coordinate component of the monotonic curve 1211 increases. Also, a y-coordinate component of the monotonic curve 1212 always decreases when an x-coordinate component of the monotonic curve 1212 increases. In other words, the y-coordinate components of the monotonic curves 1211 and 1212 always increase or always decrease when the x-coordinate components of the monotonic curves 1211 and 1212 increase.

When information about the non-monotonic curve 1210 is included in path data, the splitter 50 splits the non-monotonic curve 1210 into at least two monotonic curves 1211 and 1212. In other words, the splitter 150 changes the information about the non-monotonic curve 1210 included in the path data to information about the monotonic curves 1211 and 1212. For example, the splitter 150 may split the non-monotonic curve 1210 into the monotonic curves 1211 and 1212 based on De Casteljau's algorithm. De Casteljau's algorithm is an algorithm used to split one Bezier curve into at least two Bezier curves. Since De Casteljau's algorithm is well known to one of ordinary skill in the art, details thereof are not provided herein.

Figure 13:
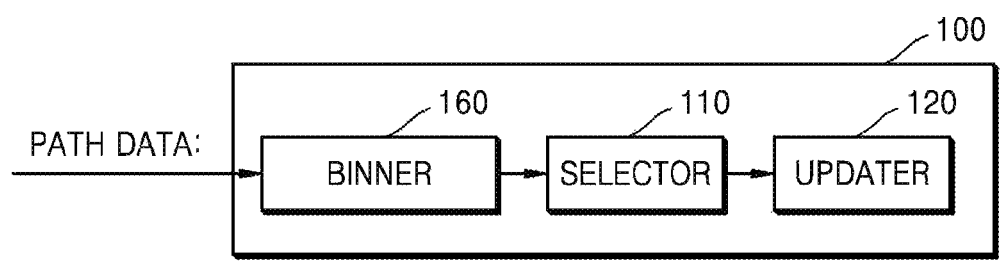
FIG. 13 is a block diagram of another example of a rendering apparatus.

FIG. 13 is a block diagram of another example of the rendering apparatus 100.

Referring to FIG. 13, the rendering apparatus 100 not only includes the selector 110 and the updater 120, but also includes the binner 160. Operations of the selector 110 and the updater 120 of FIG. 13 are the same as the operations of the selector 110 and the updater 120 described above with reference to FIGS. 1 through 9. Accordingly, details about the selector 110 and the updater 120 will not be provided again.

The binner 160 generates tile bin data by determining an initial winding number of each of tiles included in a frame based on a location and a proceeding direction of a path. In detail, the binner 160 generates the tile bin data based on a command corresponding to the path and information about vertexes forming the path included in path data. The tile bin data is the same as the tile bin data described above with reference to FIGS. 3 and 6A. An example of operating the binner 160 will now be described with reference to FIG. 14.

Figure 14:
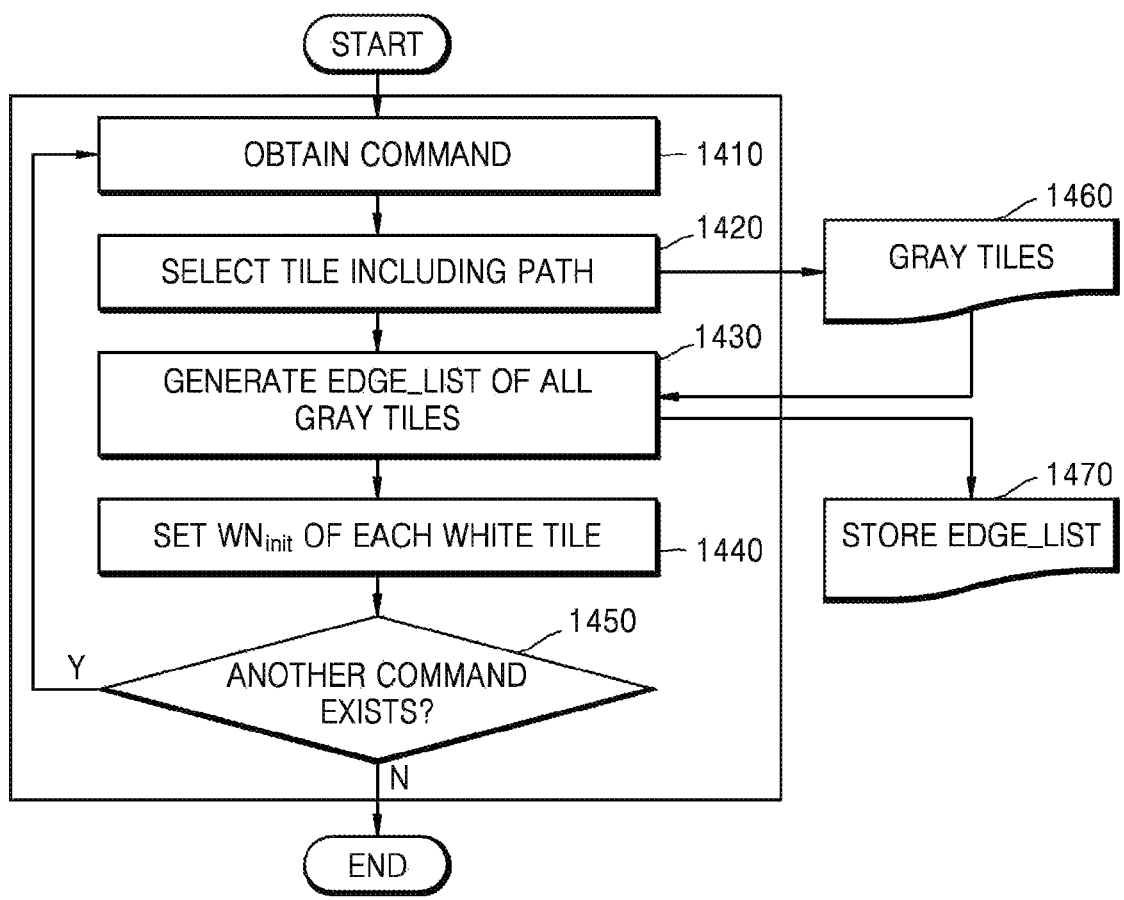
FIG. 14 is a flowchart of an example of operating a binner.

FIG. 14 is a flowchart of an example of operating the binner 160.

The binner 160 obtains a command from path data in operation 1410. Also, the binner 160 selects tiles through which a path passes among tiles included in a frame n operation 1420. In other words, the binner 160 selects tiles (gray tiles 1460) through which a path passes from the tiles included in the frame. The binner 160 generates an Edge_List of each of the gray tiles 1460 in operation 1430. The Edge_List of each of the gray tiles 1460 is stored in the local memory 1923 to be described later in operation 1470.

The binner 160 sets an initial winding number ($WN_{init}$) for each of tiles (white tiles) located on one side of the gray tiles 1460 among the tiles included in the frame in operation 1440.

Then, the binner 160 determines whether a command that has not been used during the tile binning still exists in the path data in operation 1450. If a command that has not been used during the tile binning still exists, operation 1410 is performed, and if a command that has not been used during the tile binning does not exist, the operation of the binner 160 is ended.

Figure 15:
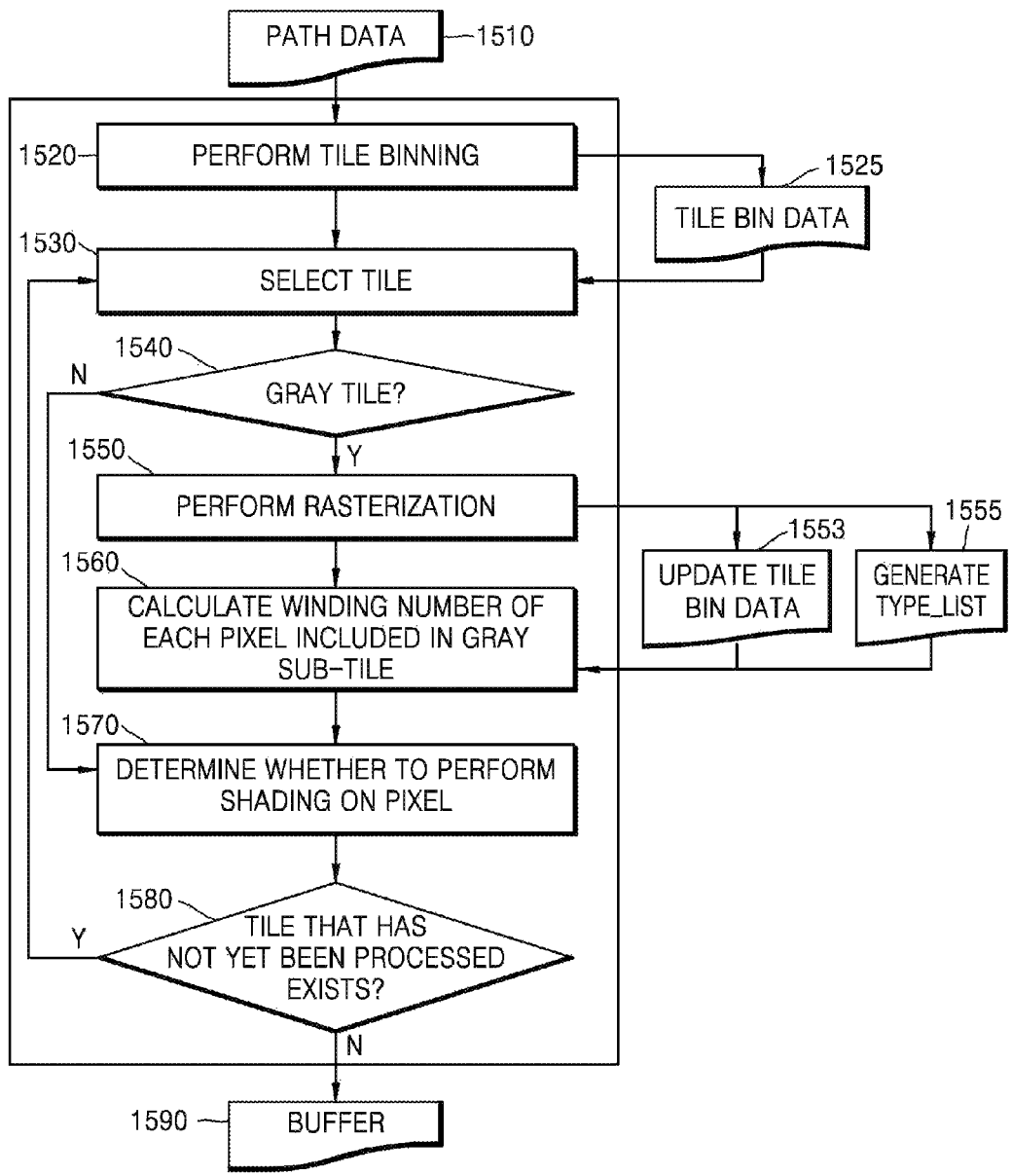
FIG. 15 is a flowchart of an example of rendering performed by a rendering apparatus.

FIG. 15 is a flowchart of an example of rendering performed by the rendering apparatus 100.

The binner 160 performs tile binning on tiles included in a frame based on path data 1510 in operation 1520. An example of the binner 160 performing tile binning has been described above with reference to FIGS. 13 and 14. The binner 160 performs the tile binning to generate tile bin data 1525.

The selector 110 selects one of the tiles included in the frame in operation 1530. Then, the selector 110 determines whether the selected tile is a gray tile in operation 1540. In detail, the selector 110 determines whether the selected tile is a gray tile based on information included in the tile bin data 1525. If the selected tile is a gray tile, operation 1550 is performed, and if not, operation 1570 is performed.

The selector 110 and the updater 120 perform rasterization on the selected tile in operation 1550. When the selector 110 and the updater 120 perform the rasterization, the tile bin data 1525 is updated in operation 1553 and a Type_List is generated in operation 1555. An example of the selector 110 and the updater 120 performing rasterization will now be described with reference to FIG. 16.

Figure 16:
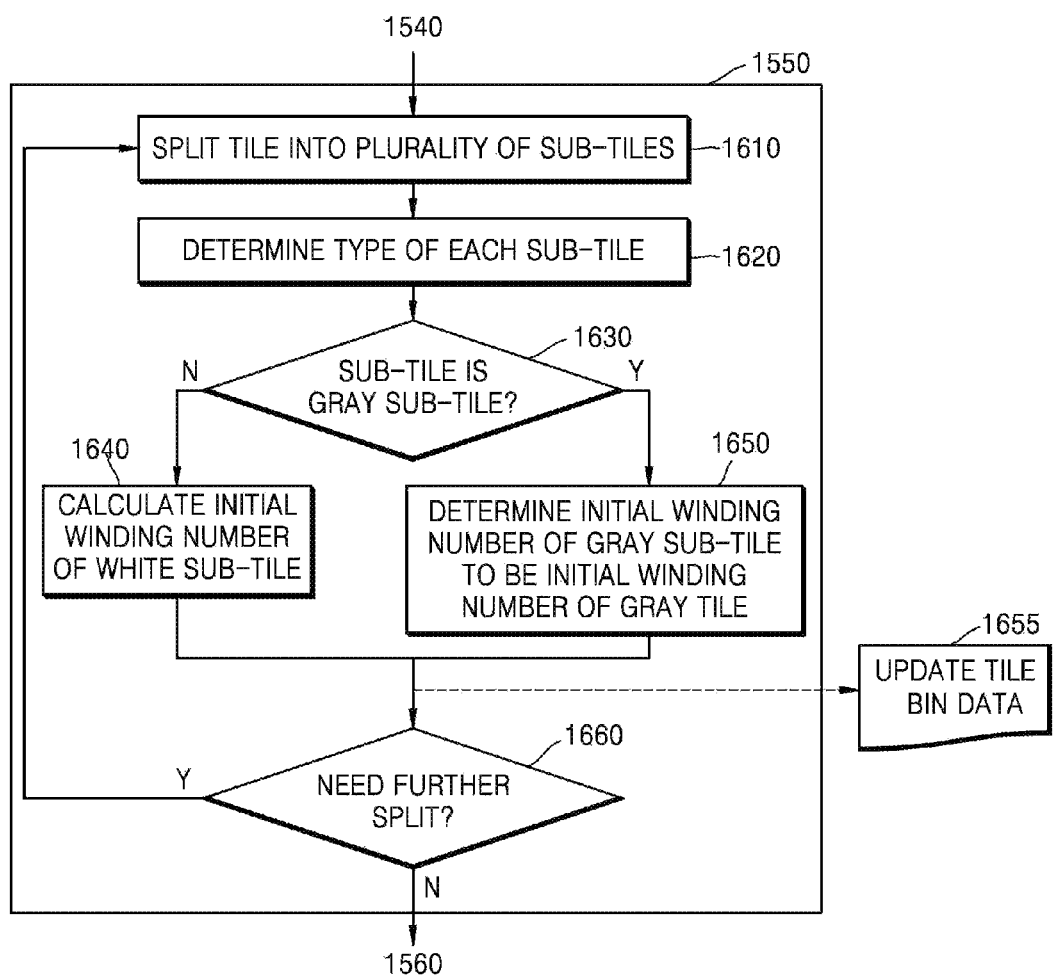
FIG. 16 is a flowchart of an example of rasterization performed by a selector and an updater.

FIG. 16 is a flowchart of an example of rasterization performed by the selector 110 and the updater 120.

The selector 110 splits a tile into a plurality of sub-tiles in operation 1610. In other words, the selector 110 splits a gray tile into a plurality of sub-tiles.

Then, the selector 110 determines a type of each of the sub-tiles in operation 1620. In detail, the selector 110 determines a sub-tile through which a path passes among the sub-tiles to be a gray sub-tile, and a sub-tile through which a path does not pass to be a white sub-tile.

Thereafter, the selector 110 determines whether a sub-tile is a gray sub-tile in operation 1630. When the sub-tile is a gray sub-tile, operation 1650 is performed, and when the sub-tile is a white sub-tile, operation 1640 is performed.

The updater 120 calculates an initial winding number of the white sub-tile in operation 1640. In detail, the updater 120 calculates the initial winding number of the white sub-tile by considering an initial winding number of a tile including the white sub-tile, and a location and a proceeding direction of a path passing through the tile.

Also, the updater 120 determines an initial winding number of the gray sub-tile to be an initial winding number of a tile including the gray sub-tile in operation 1650. In other words, the gray sub-tile uses the initial winding number of the tile.

The updater 120 updates tile bin data in operation 1655 based on the initial winding numbers obtained in operations 1640 and 1650. Also, the updater 120 stores the updated tile bin data and the Type_List in the local memory 1923 to be described later.

The selector 110 determines whether a sub-tile needs to be further split in operation 1660. For example, when the gray sub-tile includes more than 2*2 pixels, the selector 110 splits the gray sub-tile into smaller sub-tiles. If it is determined that the sub-tile needs to be further split, operation 1610 is performed, and if not, the rasterization is ended.

Referring back to FIG. 15, the calculator 130 calculates a winding number of each pixel included in the gray sub-tile in operation 1560. The tile bin data updated in operation 1553 and the Type_List generated in operation 1555 are stored in the local memory 1923 as described above with reference to FIG. 16. Also, the determiner 140 determines whether to perform shading on a pixel in operation 1570. An example of the calculator 130 calculating a winding number of a pixel and the determiner 140 determining whether to perform shading on a pixel will now be described with reference to FIG. 17.

Figure 17:
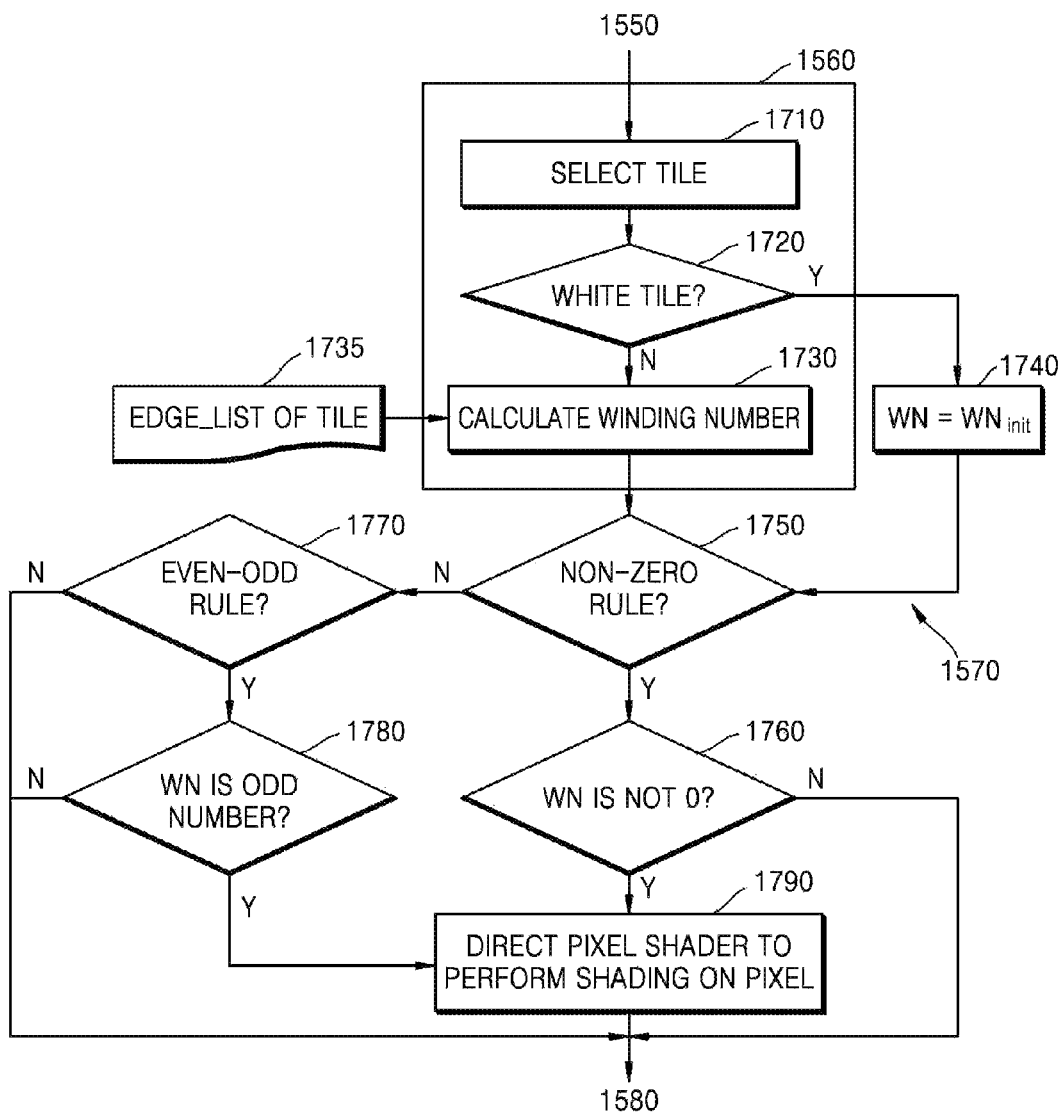
FIG. 17 is a flowchart of an example of operating a calculator and a determiner.

FIG. 17 is a flowchart of an example of operating the calculator 130 and the determiner 140.

The calculator 130 selects any one of tiles included in a frame in operation 1710, and determines whether the selected tile is a white tile in operation 1720. If the selected tile is a white tile, operation 1740 is performed, and if not, operation 1730 is performed.

If the selected tile is a white tile, the calculator 130 determines a winding number (WN) of each of pixels included in the white tile as an initial winding number (WN$_{init}$) of the white tile in operation 1740.

If the selected tile is a gray tile, the calculator 130 calculates a winding number of each of pixels included in the gray tile. The calculator 130 may request a winding number generator independent of the rendering apparatus 100 to calculate the winding number of the pixel. The calculator 130 or the winding number generator calculates a winding number of each of pixels included in a tile based on the Edge_List 1735 stored in the local memory 1923 to be described later. An example of the calculator 130 or the winding number generator calculating a winding number of a pixel will be described later with reference to FIG. 18.

The determiner 140 determines whether to perform shading on each of the pixels based on a first rule in operation 1750. The first rule is a rule (a non-zero rule) that sets a color value for a pixel that has a non-zero value as a winding number. If the determiner 140 determines to set a color value for a pixel based on the first rule, operation 1760 is performed, and if not, operation 1770 is performed.

The determiner 140 determines whether a winding number of each pixel is not 0 in operation 1760. The determiner 140 directs a pixel shader 1930 in FIG. 19 that will be described later to perform shading on a pixel having a non-zero winding number in operation 1790.

The determiner 140 determines whether to set a color for each of the pixels based on a second rule in operation 1770. The second rule is a rule (an even-odd rule) that sets a color value for a pixel having an odd winding number. If the determiner 140 determines to set a color for each pixel based on the second rule, operation 1780 is performed, and if not, the operation is ended.

As described above with reference to operations 1750 and 1770, the determiner 140 determines whether to perform shading on a pixel based on the first or second rule, but the determiner 140 is not limited thereto. For example, the determiner 140 may determine whether to perform shading on a pixel based on an inverse rule of the first rule (an inverse non-zero rule) or an inverse rule of the second rule (an inverse even-odd rule).

The determiner 140 determines whether a winding number of each pixel is an odd number in operation 1780. An odd number means that an absolute value of the winding number of the pixel is an odd number. For example, when a winding number is +3, the winding number is an odd number, and when a winding number is −3, the winding number is also an odd number. The determiner 140 directs the pixel shader 1930 to perform shading on a pixel having an odd winding number in operation 1790.

Referring back to FIG. 15, the rendering apparatus 100 determines whether a tile that has not yet been processed exists among the tiles included in the frame in operation 1580. Operations 1530 through 1570 are processes of processing one tile. Accordingly, the rendering apparatus 100 performs operations 1530 through 1570 on the tile that has not yet been processed among the tiles included in the frame. If all of the tiles have been processed, the rendering apparatus 100 stores process results in a buffer 1590.

Figure 18:
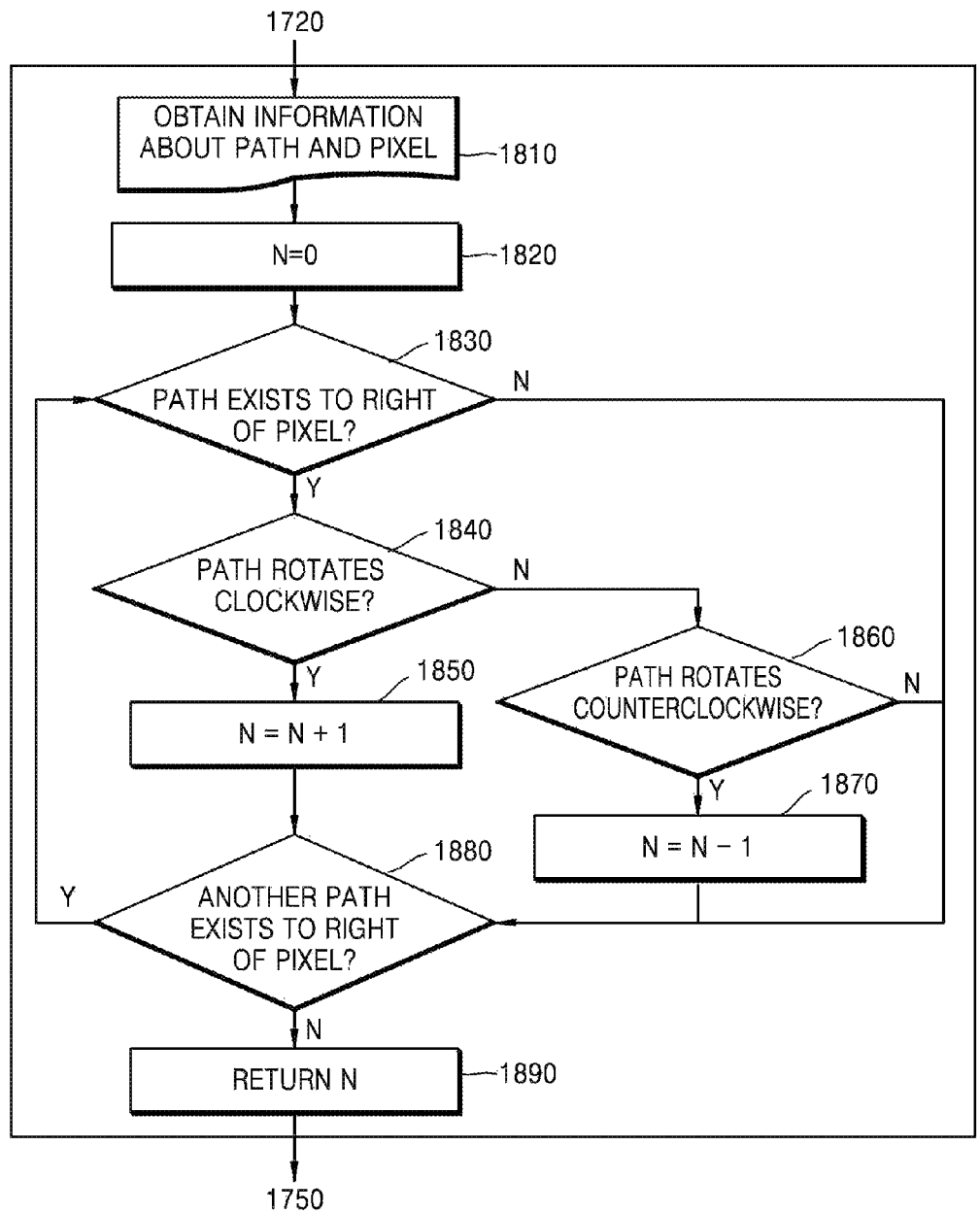
FIG. 18 is a flowchart of an example of calculating a winding number of a pixel performed by a calculator or a winding number generator.

FIG. 18 is a flowchart of an example of calculating a winding number of a pixel performed by the calculator 130 or a winding number generator.

Hereinafter, it is described that the calculator 130 calculates a winding number of a pixel. The winding number generator may also calculate the winding number of the pixel according to FIG. 18.

In operation 1810, the calculator 130 obtains information about coordinates of vertexes included in a path, and about a coordinate of a pixel P.

In operation 1820, the calculator 130 sets a default value of a winding number N of the pixel P to 0.

In operation 1830, the calculator 130 determines whether the path exists on one side of the pixel P. In FIG. 18, it is described that the calculator 130 determines whether the path exists to the right of the pixel P, but the calculator 130 is not limited thereto. For example, the calculator 130 may determine whether the path exists to the left of the pixel P, or below the pixel P, or above the pixel P. If the path exists to the right of the pixel P, operation 1840 is performed, and if not, operation 1880 is performed.

In operation 1840, the calculator 130 determines whether the path existing to the right of the pixel P rotates clockwise. If the path rotates clockwise, operation 1850 is performed, and if not, operation 1860 is performed.

In operation 1850, the calculator 130 adds 1 to the winding number N of the pixel P.

In operation 1860, the calculator 130 determines whether the path existing to the right of the pixel P rotates counterclockwise. If the path rotates counterclockwise, operation 1870 is performed, and if not, operation 1880 is performed.

In operation 1870, the calculator 130 subtracts 1 from the winding number N of the pixel P.

In operation 1880, the calculator 130 determines whether another path exists to the right of the pixel P. If the other path exists to the right of the pixel P, operation 1830 is performed, and if not, operation 1890 is performed.

In operation 1890, the calculator 130 returns the winding number N of the pixel P to the determiner 140.

FIGS. 19 through 22 are diagrams for describing examples of a method of performing path rendering using a graphics processing unit (GPU) or a separate hardware accelerator.

Figure 19:
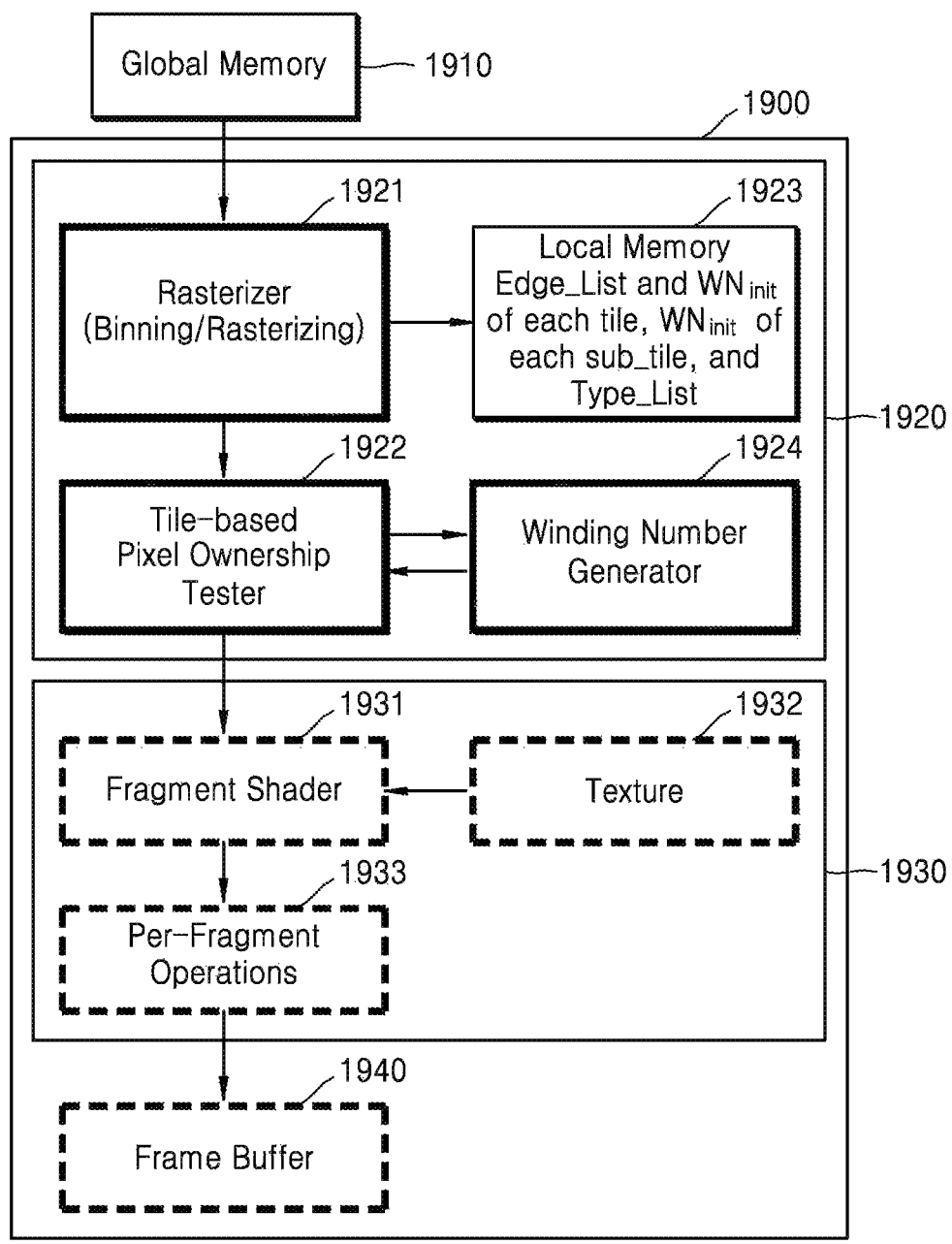
FIGS. 19 through 22 are diagrams for describing examples of a method of performing path rendering using a graphics processing unit (GPU) or a separate hardware accelerator.

Referring to FIG. 19, a method of performing path rendering executed by a GPU 1900 includes operations performed sequentially by the rendering apparatus 100 of FIG. 1, 10, 11, or 13. Accordingly, even if omitted, details described above with reference to the rendering apparatus 100 of FIG. 1, 10, 11, or 13 are also applicable to the method of FIG. 19.

Referring to FIG. 19, the GPU 1900 includes a vertex shader 1920, the pixel shader 1930, and a frame buffer 1940. The GPU 1900 is connected to a global memory 1910, and receives path data from the global memory 1910.

The vertex shader 1920 performs the same operations as the rendering apparatus 100. In other words, a rasterizer 1921 performs operations of the binner 160, the selector 110, and the updater 120, a tile-based pixel ownership tester 1922 performs operations of the determiner 140, and a winding number generator 1924 performs operations of the calculator 130. The winding number generator 1924 may be included in the GPU 1900 as shown in FIG. 19, or may be independently located outside the GPU 1900. Also, the Edge_List, the tile bin data, and the Type_List generated according to operations of the vertex shader 1920 are stored in the local memory 1923.

The pixel shader 1930 performs shading on each of pixels included in a frame. First, the pixel shader 1930 (or the fragment shader 1931 included in the pixel shader 1930) sets a color value for each pixel. The fragment shader 1931 sets a color value for each pixel based on a pre-stored texture 1932. Then, the pixel shader 1930 performs a post-process operation on each pixel. The post-process operation includes a blending operation, an anti-aliasing operation, or per-fragment operations 1933. Thereafter, the pixel shader 1930 transmits a result of performing the post-process operation to the frame buffer 1940, and the frame buffer 1940 stores information received from the pixel shader 1930.

Figure 20:
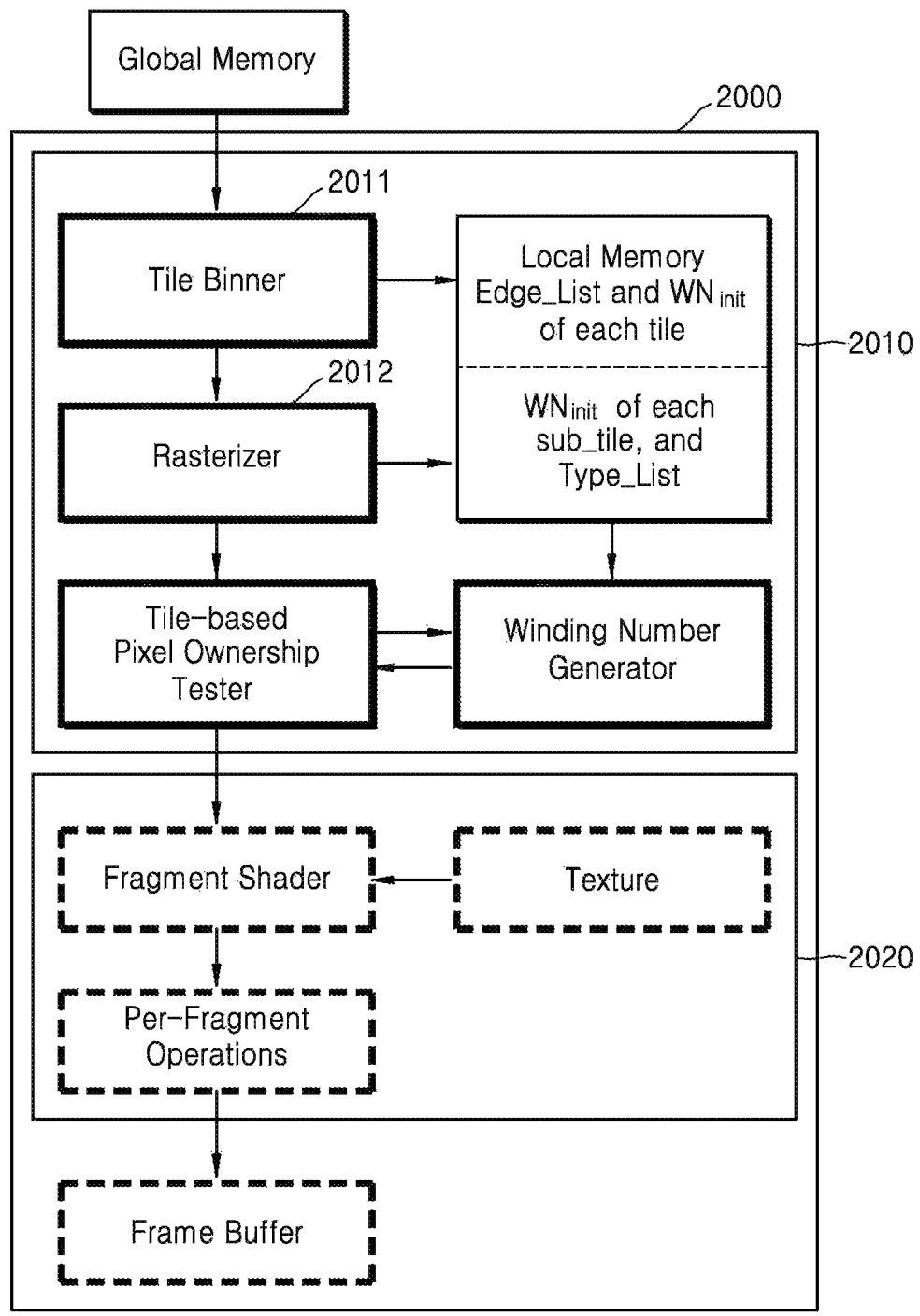

Comparing a GPU 2000 of FIG. 20 with the GPU 1900 of FIG. 19, in a vertex shader 2010 of the GPU 2000, a tile binner 2011, and a rasterizer 2012 are separately included. In other words, in the GPU 1900, the rasterizer 1921 performs operations of the binner 160, the selector 110, and the updater 120, whereas in the GPU 2000, the tile binner 2011 performs operations of the binner 160, and the rasterizer 2012 performs operations of the selector 110 and the updater 120.

Other than the above differences, the GPU 2000 of FIG. 20 and the GPU 1900 of FIG. 19 perform the same operations. A pixel shader 2020 of the GPU 2000 is the same as the pixel shader 1930 of the GPU 1900.

Figure 21:
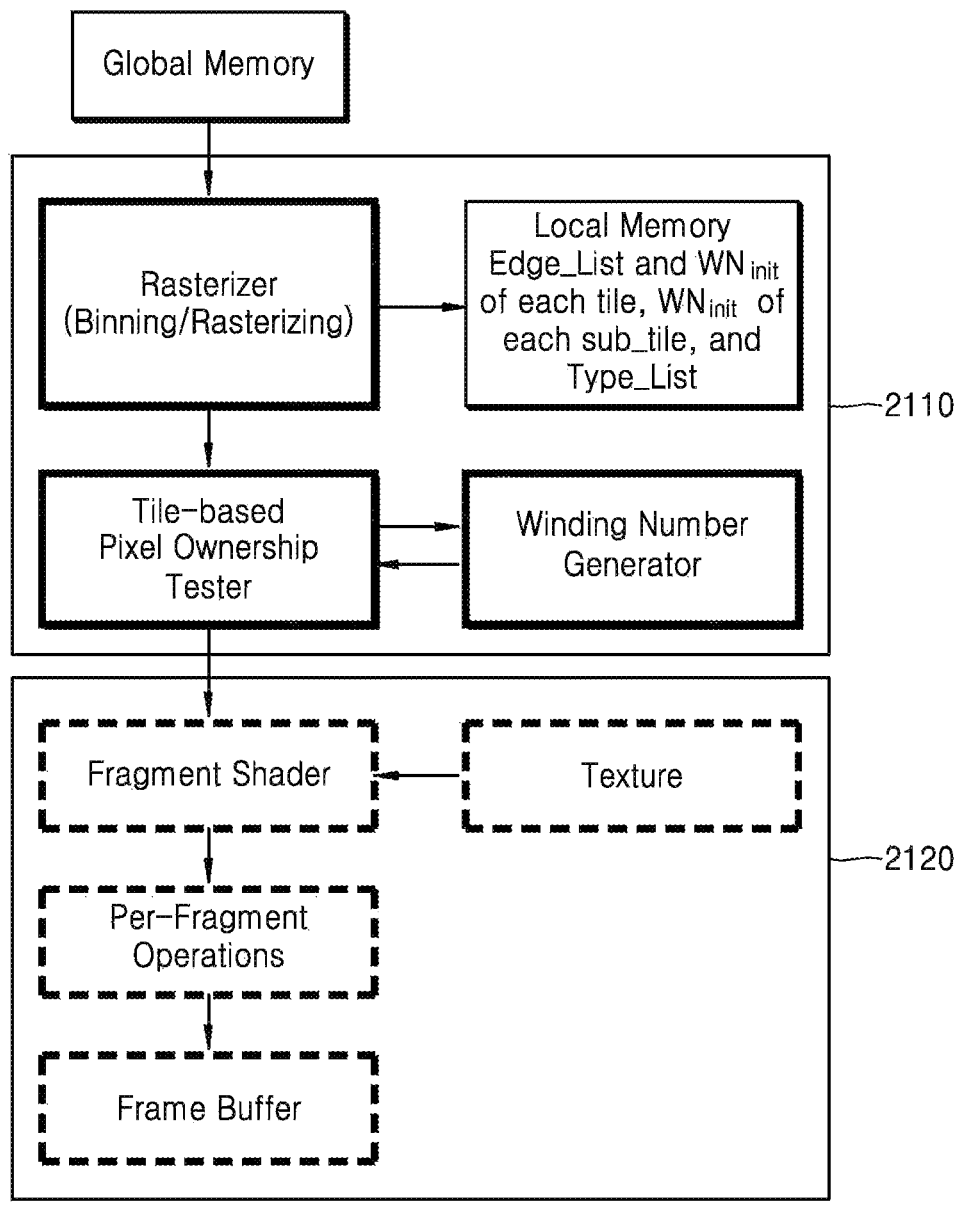

Referring to FIG. 21, a GPU 2120 only performs operations of the pixel shader 1930 of FIG. 19, and operations of the vertex shader 1920 of FIG. 19 are performed by a hardware accelerator 2110. In other words, the vertex shader 1920 of FIG. 19 may be implemented inside the GPU 2120, or may be implemented by separate hardware.

Figure 22:
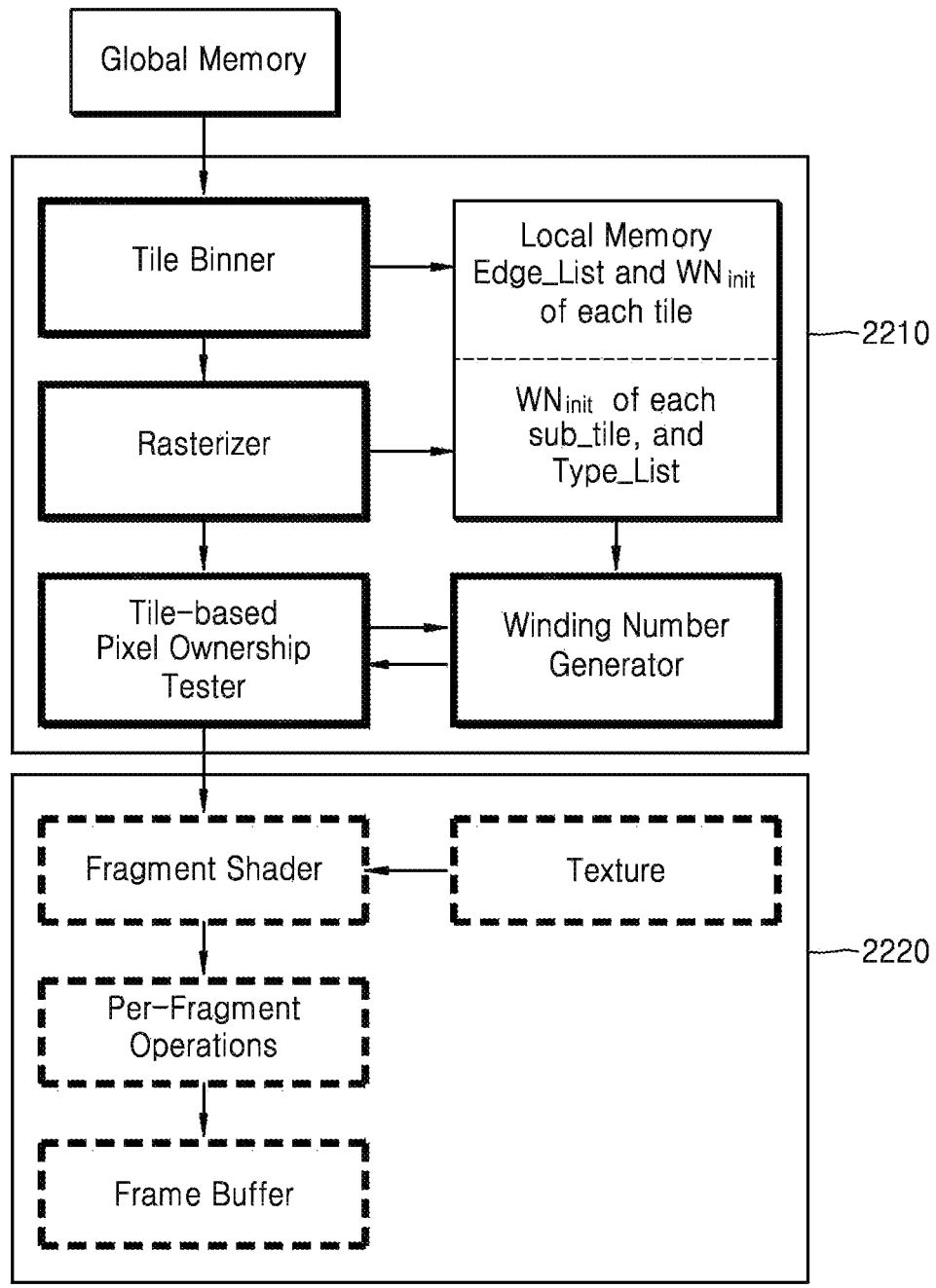

FIG. 22 illustrates an example of the vertex shader 2010 of FIG. 20 implemented by a hardware accelerator 2210. In other words, a GPU 2220 only performs operations of the pixel shader 2020 of FIG. 20, and operations of the vertex shader 2010 of FIG. 20 are performed by the hardware accelerator 2210.

As described above, the rendering apparatus 100 splits a tile into sub-tiles of smaller and smaller sizes (i.e., hierarchically splits a tile), thereby precisely identifying a region through which a path actually passes in the tile. Also, the rendering apparatus 100 precisely selects and processes a region through which a path passes in a frame, and thus rendering quality increases. Also, since the rendering apparatus 100 performs rendering in a sub-tile unit that is smaller than a tile unit, computations required during the rendering decrease.

The rendering apparatus 100, the selector 110, and the updater 120 in FIGS. 1, 10, 11, and 13, the calculator 130 and the determiner 140 in FIG. 10, the splitter 150 in FIG. 11, the binner 160 in FIG. 13, the GPU 1900, the global memory 1910, the vertex shader 1920, the rasterizer 1921, the tile-based ownership tester 1922, the local memory 1923, the winding number generator 1924, the pixel shader 1930, the fragment shader 1931, and the frame buffer 1940 in FIG. 19, the global memory, the tile-based pixel ownership tester, the local memory, the winding number generator, the fragment shader, and the frame buffer in FIGS. 20-22, the GPU 2000, the vertex shader 2010, the tile binner 2011, the rasterizer 2012, and the pixel shader 2020 in FIG. 20, the hardware accelerator 2110, the rasterizer, and the GPU 2120 in FIG. 21, and the hardware accelerator 2210, the tile binner, the rasterizer, and the GPU 2220 in FIG. 22 that perform the operations described herein with respect to FIGS. 1-22 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-22. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 7, and 14-18 that perform the operations described herein with respect to FIGS. 1-22 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing path rendering of an image using a graphics processing hardware, the method comprising:
   selecting, using at least one processor, a tile including a path to be rendered from tiles in a frame of the image based on tile bin data;
   splitting, using the at least one processor, the selected tile into a plurality of first sub-tiles;
   determining, using the at least one processor, whether the path is included in each of the plurality of first sub-tiles;
   updating, using the at least one processor, an initial winding number of the plurality of first sub-tiles based on results of the determining; and
   rendering, using the at least one processor, at least one pixel of the frame based on the updated initial winding number of the plurality of first sub-tiles,
   wherein the tile bin data comprises an initial winding number of each of the tiles in the frame.

2. The method of claim 1, further comprising:
   splitting, using the at least one processor, a first sub-tile that includes the path into a plurality of second sub-tiles; and
   determining, using the at least one processor, whether the path is included in each of the plurality of second sub-tiles,
   wherein the updating comprises updating an initial winding number of each of the plurality of second sub-tiles.

3. The method of claim 1, further comprising:
   determining, using the at least one processor, an initial winding number of the first sub-tile that includes the path among the plurality of first sub-tiles to be the initial winding number of the tile including the first sub-tile that includes the path.

4. The method of claim 1, wherein the updating comprises updating the initial winding number of each of first sub-tiles based on a location and a proceeding direction of the path included in the tile including the first sub-tiles.

5. The method of claim 1, further comprising,
   splitting, using the at least one processor, the path into a plurality of monotonic curves in response to the path being a non-monotonic curve;
   wherein the selecting of the tile comprises selecting a tile including at least one of the plurality of monotonic curves from the tiles in the frame.

6. The method of claim 1, further comprising:
   calculating, using the at least one processor, a winding number of each of a plurality of pixels in the frame based on the updated initial winding number of the first sub-tile associated with the pixel and an initial winding number of each of the plurality of pixels in the tile bin data.

7. The method of claim 6, wherein the rendering the at least one pixel of the frame comprises:

determining, using the at least one processor, whether to perform shading on the at least one pixel based on the calculated winding number of the at least one pixel.

8. The method of claim 1, further comprising:
generating, using the at least one processor, the tile bin data by determining the initial winding number of each of the tiles in the frame based on a location and a proceeding direction of the path.

9. The method of claim 1, further comprising:
splitting, using the at least one processor, an N-th sub-tile that includes the path into a plurality of (N+1)-th sub-tiles;
selecting, using the at least one processor, an (N+1)-th sub-tile that does not include the path from the plurality of (N+1)-th sub-tiles; and
updating, using the at least one processor, an initial winding number of the selected (N+1)-th sub-tile;
wherein N is greater than or equal to 2, and less than or equal to a natural number corresponding to a case in which the selected (N+1)th sub-tile comprises only four pixels.

10. A non-transitory computer-readable storage medium storing computer readable instructions to cause computing hardware to perform the method of claim 1.

11. A graphics processing apparatus for performing path rendering of an image, the apparatus comprising:
a memory having computer readable instructions stored thereon; and
at least one processor configured to execute the computer readable instructions to,
select a tile including a path to be rendered from tiles in a frame of the image based on tile bin data,
split the selected tile into a plurality of first sub-tiles,
determine whether the path is included in each of the plurality of first sub-tiles,
update an initial winding number of each of the plurality of first sub-tiles based on results of the determining, and
render at least one pixel of the frame based on the updated initial winding number of the plurality of first sub-tiles,
wherein the tile bin data comprises an initial winding number of each of the tiles in the frame.

12. The apparatus of claim 11, wherein the at least one processor is further configured to:
split a first sub-tile that includes the path into a plurality of second sub-tiles;
determine whether the path is included in each of the plurality of second sub-tiles; and
update an initial winding number of each of the plurality of second sub-tiles.

13. The apparatus of claim 11, wherein the at least one processor is further configured to:
determine an initial winding number of the first sub-tile that includes the path from the plurality of first sub-tiles to be the initial winding number of the tile including the first sub-tile that includes the path.

14. The apparatus of claim 11, wherein the at least one processor is further configured to:
update the initial winding number of each of the first sub-tiles based on a location and a proceeding direction of the path included in the tile including first sub-tiles.

15. The apparatus of claim 11, wherein the at least one processor is further configured to:
split the path into a plurality of monotonic curves in response to the path being a non-monotonic curve; and
select a tile including at least one of the plurality of monotonic curves from the tiles in the frame.

16. The apparatus of claim 11, wherein the at least one processor is further configured to:
calculate a winding number of each of a plurality of pixels in the frame based on the updated initial winding number of the first sub-tile associated with the pixel and an initial winding number of each of the plurality of pixels in the tile bin data.

17. The apparatus of claim 16, wherein the at least one processor is further configured to Perform the rendering of the at least one pixel of the frame by:
determining whether to perform shading on the at least one pixel based on the calculated winding number of the at least one pixel.

18. The apparatus of claim 11, wherein the at least one processor is further configured to:
generate the tile bin data by determining the initial winding number of each of the tiles in the frame based on a location and a proceeding direction of the path.

19. The apparatus of claim 11, wherein the at least one processor is further configured to:
split an N-th sub-tile that includes the path into a plurality of (N+1)th sub-tiles;
select an (N+1)th sub-tile that does not include the path from the plurality of (N+1)th sub-tiles;
update an initial winding number of the selected (N+1)th sub-tile; wherein
N is greater than or equal to 2, and less than or equal to a natural number corresponding to a case in which the selected (N+1)th sub-tile comprises only four pixels.

* * * * *